United States Patent
Saitoh

(10) Patent No.: US 6,377,304 B1
(45) Date of Patent: Apr. 23, 2002

(54) SOLID-STATE IMAGE-PICKUP DEVICES EXHIBITING FASTER VIDEO-FRAME PROCESSING RATES, AND ASSOCIATED METHODS

(75) Inventor: Akihiro Saitoh, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/019,493

(22) Filed: Feb. 5, 1998

(51) Int. Cl.[7] ............................................... H04N 5/335
(52) U.S. Cl. ......................................................... 348/308
(58) Field of Search ................................... 348/294, 302, 348/303, 304, 307, 308, 309, 272, 273, 277, 280, 281, 345; 250/208.1; H04N 5/335

(56) References Cited

U.S. PATENT DOCUMENTS

| | | |
|---|---|---|
| 4,942,474 A | 7/1990 | Akimoto et al. |
| 5,262,871 A * | 11/1993 | Wilder et al. ................ 348/308 |
| 5,693,932 A * | 12/1997 | Ueno et al. .................. 348/308 |
| 5,717,199 A * | 2/1998 | Carbone et al. ............. 348/308 |

* cited by examiner

Primary Examiner—Tuan Ho
(74) Attorney, Agent, or Firm—Klarquist Sparkman, LLP

(57) ABSTRACT

Solid state image-pickup devices and associated circuit driving methods are disclosed that provide a video signal with enhanced video frame refresh rates. Multiple pixels are arranged in a planar array of columns and rows. Each column has a separate vertical read-out line. The pixel outputs in each column are connected to a respective vertical read-out line. A vertical scanning circuit controllably switches the outputs of the pixels in each column to respective vertical read-out lines according to a predetermined horizontal-line read-out sequence. A multiplexer distributes the pixel output signals carried by the vertical read-out lines to multiple multiplexer outputs. A horizontal accumulator temporarily accumulates the pixel output signals for delivery to horizontal-accumulator outputs. Horizontal scanning means controllably trigger pixel output signals temporarily accumulated in the horizontal accumulator for sequential read-out onto horizontal read-out lines to form a video signal. The output signals from multiple adjacent pixels are simultaneously combined.

24 Claims, 22 Drawing Sheets

Charts Showing Video Signal Output Timing:
for Example Embodiment 5

SOLID-STATE IMAGE-PICKUP DEVICES EXHIBITING FASTER VIDEO-FRAME PROCESSING RATES, AND ASSOCIATED METHODS

FIELD OF THE INVENTION

This invention pertains to solid-state image-pickup devices and associated drive-signal timing methods. Such solid-state image-pickup devices comprise a plurality of light-sensitive pixels arranged in a planar array and output a video signal corresponding to the image sensed by the pixels. In particular, this invention pertains to solid-state image-pickup devices that produce video signals with improved video-frame processing rates.

BACKGROUND OF THE INVENTION

Solid-state image-pickup devices are typically used in electronic camera equipment such as camcorders and digital still cameras. These devices measure light intensity at multiple discreet locations on a plane to image a scene. The devices contain an array of pixels that convert light intensity into measurable voltage signals. These voltage signals are then processed to produce a video output signal that may be stored or viewed on a video display.

Until recently, solid-state image-pickup devices provided relatively low display resolutions and generally comprised 100,000 pixels or less. More contemporary solid-state image-pickup devices have much higher resolutions, with the most recent devices employing 300,000 to 1,000,000 pixels.

While higher-resolution imaging devices are desirable, they have the drawback of requiring more signal processing to produce each frame of video output signal. This additional signal processing often results in an undesirable time-lag between the sensing and display of the image. If the imaged subject (such as a person) is moving, the time-lag may cause the displayed image (as viewed by the operator of the camera equipment) to have an inaccurate sense of what is happening in real time. This is especially a concern with digital still cameras, because if the image displayed on the viewfinder is not in real time, the camera operator will not be certain of the picture that will result when the camera shutter is actuated.

Consider a case in which a video image is displayed on the small electronic viewfinder of a camcorder or digital still camera. If the photographic subject is moving, the image displayed on the viewfinder must be updated, or "refreshed," frequently to smoothly (and accurately) display the photographic subject. Each refresh comprises outputting a new "frame" of video information to the viewfinder. The updating frequency directly affects how smoothly and accurately the photographic subject is displayed; higher refresh rates provide for smoother displays of motion. For example, the film industry uses a refresh rate of 24 frames per second, and a television screen is typically updated at 30 frames per second. Both of these frame rates provide smooth flicker-free viewing for most people.

As the number of pixels in a solid-state image-pickup device increases, the time to refresh each frame necessarily increases. This is because the processing and display of each pixel requires a finite amount of time; the more pixels to process, the more time required. Images directly displayed from many types of conventional high-resolution solid-state image-pickup devices often exhibit prohibitively slow frame-updating speeds. It is then necessary to provide additional video processing measures, such as decreasing the number of pixels in the video signal, to provide adequate frame-updating speeds.

An additional problem inherent in the use of conventional solid-state image-pickup devices pertains to displaying video output on monitors or viewfinders that have a different pixel aspect ratio than that of the solid-state image-pickup device. For instance, a standard television has a display resolution of 755 horizontal×484 vertical pixels, which equates to an aspect ratio of 755/484 (approximately 1.6). Since the output signals from many solid-state image-pickup devices are designed to be shown on a standard television screen, these devices typically have aspect ratios close to 1.6. In contrast, many camcorder or camera viewfinders are approximately square in shape, which equates to a pixel aspect ratio of about 1.

In general, when a solid-state image-pickup device and a video display have different aspect ratios, the displayed video image will be distorted either lengthwise or widthwise. A solution to this undesirable effect is to perform additional video processing, such as adjusting the number of horizontal and/or vertical pixels in the video signal.

While additional video processing may solve the frame-updating and aspect-ratio problems, it is not the most desirable solution. Additional video processing increases the overall circuit complexity and cost, since such processing typically requires frame memory and/or subtraction circuits, etc. The additional processing steps also result in diminished frame-refresh rates.

One method for improving the screen-refresh rate is to simultaneously read-out the dark and output signals for respective horizontal lines of pixels in a continual sequential fashion. A solid-state image-pickup device that employs this technique is disclosed in Japan Kôkai Patent Document No. SHO 62-128679.

FIG. 21 schematically shows an example of an electrical circuit configuration of a solid-state image-pickup device that simultaneously reads out the dark and output signals, one horizontal line of pixels at a time.

In FIG. 21, multiple pixels 80 are arranged in a planar array of columns and rows. Each pixel 80 comprises a photodiode 81 to perform photoelectric conversion, a JFET (junction-type field-effect transistor) 82 to current-amplify the charge accumulated by the photodiode 81, a MOS switch 83 to shift the charge accumulated by the photodiode 81 to the gate electrode of the JFET 82, and a MOS switch 84 to initialize the gate potential of the JFET 82.

The gate electrodes of the MOS switches 83 are commonly connected in each horizontal line of the pixel array. Each of these horizontal lines is individually connected to respective control pulses ΦTG1, ΦTG2, . . . (ΦTG1 connected to the first horizontal line, ΦTG2 connected to the second horizontal line, etc.) that are output from a vertical scanning circuit 87.

Similarly, for a given horizontal line of pixels, the MOS switches 84 are commonly connected, with each line individually supplied with a respective control potential ΦRSD1, ΦRSD2, . . . , which is output from the vertical scanning circuit 87. In addition, the gate electrodes of the MOS switches 84 are commonly connected throughout the entire pixel array and are supplied with a control pulse ΦRSG.

The source electrodes of the JFETs 82 are commonly connected in each vertical column of pixels to respective vertical read-out lines 85. A reset MOS switch 85a and constant current source 86 are respectively connected to each of the vertical read-out lines 85. The gate electrodes of all the MOS switches 85a are commonly connected and are supplied with a control pulse ΦRSTV.

The output terminal of each vertical read-out line is connected to a pair of MOS switches 88s, 88d. The gate electrodes of the MOS switches 88s are all commonly connected and supplied with a control pulse ΦTs. The gate electrodes of the MOS switches 88d are also all commonly connected and supplied with a control pulse ΦTd. Collectively, these MOS switches and control lines form a multiplexer circuit.

Capacitors 89s, 89d are respectively connected to the output terminals of the MOS switches 88s, 88d. By following each vertical read-out line 85 upward it can be seen that a respective pair of capacitors 89s, 89d is provided for each vertical read-out line 85; thus, these capacitors are marked $89s_2$, $89d_2$ (corresponding to the first vertical read-out line), $89s_2$, $89d_2$ (corresponding to the second vertical read-out line), etc.

Two capacitors for each vertical read-out line are provided because of the pixel-output variances associated with solid-state image-pickup devices. Each pixel in the array produces a voltage output that depends on the light intensity sensed by the pixel. In the ideal case the output of each pixel would be identical (for equal light intensities), and the pixels would produce zero output when in complete darkness. However, the pixels in actual devices still produce an output, known as a dark signal, when they receive zero light. To make matters worse, the dark signal produced by each of the pixels varies. This variance in pixel output that occurs when the array receives no light is called the "fixed-pattern noise." Other forms of fixed-pattern noise (such as that associated with the pixel support circuitry) may be caused by synchronous-timing-generation effects at high data rates.

A method to reduce the effect of the fixed pattern noise is to measure the difference between the output signal and the dark signal for each pixel. Thus, a separate pair of capacitors, one to accumulate the output signal, and the other to accumulate the dark signal, are provided for each vertical read-out line. This provides a means of separately accumulating the pixel output from each horizontal line. The group represented by the capacitors $89s_1$–$89s_n$ accumulates the pixel output signals (via the JFETs 82) in horizontal line units (that is, the output signals of all the pixels in a selected horizontal line are accumulated at one time). Similarly, the group represented by the capacitors $89d_1$–$89d$ accumulates the dark (reference) signals for each pixel in horizontal line units.

The charges stored in the capacitors 89s, 89d need to be sequentially output to horizontal read-out lines. To accomplish this, each of the capacitors 89s, 89d is respectively connected to a horizontal read-out line 91s, 91d via individual horizontal scanning MOS switches 90s, 90d. As with the capacitors 89s, 89d, the MOS switches $90s_1$, $90d_1$ correspond to the first vertical read-out line, the MOS switches $90s_2$, $90d_2$ to the second vertical read-out line, etc.

The gate electrodes of each pair of MOS switches 90s, 90d commonly connected to a respective vertical read-out line 85 are supplied a respective control pulse ΦH1, ΦH2, ... output from a shift register circuit 92 (i.e., control pulse ΦH2 is supplied to the gate electrodes of the MOS switches $90s_1$, $90d_1$, control pulse ΦH2 is supplied to the gate electrodes of the MOS switches $90s_2$, $90d_2$, etc.). A start pulse and two clock pulses ΦCK1, ΦCK2 are respectively supplied to this shift register circuit 92.

MOS switches 96s, 96d for resetting the residual charges remaining in the read-out lines 91s, 91d, and capacitors 89s, 89d are respectively connected to the horizontal read-out lines 91s, 91d. The gate electrodes of the MOS switches 96s, 96d are commonly supplied a reset control pulse ΦRSTH.

FIG. 22 is a pulse chart showing the drive timing for the FIG.-21 device. The read-out operation of the solid-state image-pickup device will be explained below, with reference to this figure.

At the start of timing period T1, ΦRSD1 is switched to a high-potential bias voltage while ΦRSG is held at low potential. This initializes the gate potentials of the JFETs 82 in the first row of pixels 80 (row 1) to a desired bias potential, while the gate electrodes of the remaining JFETs 82 (those not in row 1) are held at low potential by means of ΦRSD2, ΦRSD3, ... (which remain low).

Just prior to the start of timing period T2, ΦTd1 is switched to high potential, followed by ΦRSTV being switched to low potential. As a result, the source follower output of the JFETs 82 in row 1 charges the capacitors 89d via the MOS switches 88d. By this operation, the dark signals generated by the pixels in the first row are respectively accumulated in the group of capacitors 89d.

Next, ΦTG1 is switched to low potential at the start of timing period T3. As a result, the signal charges that have been photoelectrically converted by the photodiodes 81 in row 1 are shifted to the gate electrodes of the JFETs 82 via the MOS switches 83.

Just prior to the start of timing period T4, ΦTs1 is switched to high potential, followed by ΦRSTV being switched to low potential. At this point the source follower output of the JFETs 82 in row 1 charges the capacitors 89s via the MOS switches 88s. This results in the output signals generated by the pixels in the first row being respectively accumulated in the group of capacitors 89s.

The first vertical read-out operation of the first row of pixels is completed by the above series of operations (T1–T4).

Immediately following this first vertical read-out period, as identified by timing period T90, a start pulse is supplied to the shift register circuit 92. When this occurs, the control pulses ΦH1, ΦH2, ... of the shift register circuit 92 are sequentially set to high potential according to the two shift clocks ΦCK1, ΦCK2.

As a result, the signal generated by the pixels in the first row, which has accumulated in capacitors 89s, 89d, is horizontally scanned one pixel at a time by the MOS switches 90s, 90d, and sequentially read out to the horizontal read-out lines 91s, 91d. Thus, the signal of the first row of pixels is output from the horizontal read-out lines 91s, 91d as video signals Vos, Vod.

The residual charges in the horizontal read-out lines 91s, 91d and capacitors 89s and 89d must be removed between the scanning of each horizontal line in preparation for the next pixel read-out. This "reset" is accomplished by momentarily providing a path to ground for the residual charges in each read-out line and in the most-recently scanned capacitors. This is accomplished by momentarily switching ΦRSTH to high potential just prior to the respective rise of ΦH1, ΦH2, ..., as shown in FIG. 22. As a result, in preparation for the next pixel read-out, the residual charges in the horizontal read-out lines 91s, 91d and the residual charges in the capacitors 89s, 89d that have been most-recently scanned are discharged to ground, thereby resetting the horizontal read-out lines 91s, 91d for the next pixel read-out and resetting the most recently scanned capacitors 89s, 89d for the next vertical read-out operation.

A video signal is produced by an external processing circuit (not shown) by measuring the difference between the video signals Vos, Vod, thereby removing the dark signal output (fixed-pattern noise).

A frame of video signal can be read out by repeating the above horizontal line read-out process while shifting the position of the horizontal line being read out in the vertical direction.

A limitation with the conventional device summarized above is that it cannot read out multiple rows of pixels at a time, which is another technique for enhancing screen-refresh rates.

A solid-state image-pickup device that simultaneously outputs a pair of horizontal lines is disclosed in Japan Kôkai Patent Document No. HEI 1-154678. FIG. 23 is a schematic block diagram corresponding to a conventional solid-state pickup device that can simultaneously read out multiple rows of pixel output. In FIG. 23, multiple pixels 61 are arranged in a planar array of columns and rows on the light-receiving surface of a solid-state image-pickup device. These pixels are similar to those described above. Each vertical column of pixels 61 is commonly connected to a vertical read-out line 62.

The pixels 61 and vertical read-out lines 62 are interconnected by MOS switches 63a. In each row of pixels the gate electrode of each of the MOS switches 63a is connected to a respective horizontal line. The horizontal lines are connected to respective control outputs of a shift register 63b.

The outputs of the vertical read-out lines 62 are input to a multiplexer 64. Respective horizontal accumulators 65a, 65b, each accumulating the output of one row of pixels, are provided for each output destination of the multiplexer 64. The horizontal accumulators 65a, 65b are driven by a single horizontal scanner 66.

The output timing of the video signal from the FIG.-23 device is schematically depicted in FIG. 24.

In a first vertical read-out period (FIG. 24), the shift register 63b sets all of the MOS switches 63a in the $n^{th}$ horizontal line to the ON state, and the signal charges generated by the pixels 61 of the $n^{th}$ horizontal line are input to the multiplexer 64 via the vertical read-out lines 62. The multiplexer 64 outputs the $n^{th}$ horizontal line signal to the horizontal accumulator 65a, where the signal is accumulated without alteration.

In the second vertical read-out period, the shift register 63b sets all of the MOS switches 63a in the $m^{th}$ horizontal line to the ON state, and the signal charges generated by the pixels 61 in the $m^{th}$ horizontal line are input to the multiplexer 64 via the vertical read-out lines 62. The multiplexer 64 outputs the $m^{th}$ horizontal line signal to the horizontal accumulator 65b, where the signal is accumulated without alteration.

After both horizontal accumulators 65a and 65b are loaded, they are driven in parallel by horizontal scanner 66 to simultaneously horizontally shift the $n^{th}$ horizontal line and $m^{th}$ horizontal line signals out as video signals Vos1 and Vos2, respectively. Thus, it is possible with the FIG.-23 device to read-out the signals of two horizontal lines during a single horizontal read-out period.

However, with the FIG.-23 device, no video signals can be output during the entire time frame comprising the first and second vertical read-out periods. Operation of the horizontal accumulator 65b is stopped (it receives no input and provides no output) during the first vertical read-out period, as shown in FIG. 24. Similarly, operation of the horizontal accumulator 65a is stopped during the second vertical read-out period. These idle periods are repeated for every pair of horizontal lines being read out. As a result, the idle periods significantly reduce the frame-refresh speed of the FIG.-23 device.

SUMMARY OF THE INVENTION

In view of the foregoing shortcomings of conventional devices, an object of this invention is to provide a solid-state image-pickup device that produces a video signal with improved screen-refresh rates. Another object of this invention is to provide a solid-state image-pickup device that produces a video signal that can be directly displayed on a video screen without requiring additional video processing.

The invention is exemplified by several device embodiments that accomplish the foregoing objects by simultaneously combining the pixel output signals from adjacent pixels and reading out the combined output signals to produce a video signal, and/or by simultaneously reading out the output signals from multiple horizontal lines of pixels to produce a video signal.

According to one aspect of the invention, solid-state image-pickup devices are provided that comprise multiple pixels arranged in a planar array of columns and rows, each pixel producing an electrical output signal according to a light quantity received by the pixel.

According to a first representative embodiment, a separate vertical read-out line is provided for each column of pixels, with the outputs of each pixel in a respective column commonly connected to a respective vertical read-out line. Each vertical read-out line has an output terminus. Control inputs for triggering the pixel outputs are commonly connected by row to respective control signal lines output from a vertical scanning circuit. The vertical scanning circuit controllably switches the outputs of the multiple pixels in each column to the vertical read-out lines according to a predetermined horizontal-line read-out sequence. The vertical read-out line output termini are connected to a multiplexer that distributes the pixel output signals carried by the vertical read-out lines to multiple selected multiplexer outputs. A horizontal accumulator is connected to the multiplexer outputs and temporarily accumulates the respective pixel output signals output from the multiplexer for delivery to horizontal accumulator outputs. The horizontal accumulator outputs are connected to horizontal read-out lines. The device further comprises horizontal scanning means for controllably triggering pixel output signals temporarily accumulated in the horizontal accumulator for sequential read-out onto the horizontal read-out lines to form a video signal. The device components are driven so-as to simultaneously combine the output signals from adjacent pixels to produce a video signal. The combined pixel-output signals can be made from N (where N≧2) horizontally adjacent pixels, M (where M≧2) vertically adjacent pixels, or (N horizontal×M vertical) adjacent pixels.

According to a second representative embodiment, the solid-state image-pickup device can comprise red (R), green (G), and blue (B) filters arranged in a Bayer array sequence above the pixels. According to the arrangement of the filters, the pixels are grouped by R, G, and B color designators such that no two horizontally or vertically adjacent pixels share the same designator. The pixels designated with a G are diagonally connected throughout the array, with the remaining pixels designated by alternating rows of R and B. The combined output signals from M (where M≧2) vertically adjacent pixels that share the same color designator can be sequentially read-out with this device. Alternately, the combined output signals from N (where N≧2) horizontally adjacent pixels that share the same color designator can be sequentially read-out with this device.

According to a third representative embodiment, a solid-state image-pickup device is provided comprising multiple horizontal accumulators and multiple respective horizontal scanning circuits. Each horizontal scanning circuit individually drives a respective horizontal accumulator to sequentially read out the accumulated pixel output signals stored in each horizontal accumulator to form a video signal. The output signals from M (where M≧1) horizontal lines of pixels are divided and stored in the horizontal accumulators. The horizontal accumulators can be individually driven by respective horizontal scanning circuits to horizontally shift the output signals from M horizontal lines of pixels in parallel to the horizontal read-out lines.

Each of the pixels in any of various embodiments of the invention preferably comprises a respective photodiode for performing photoelectric conversion of the light quantity received by the pixel, a respective JFET (junction-type field-effect transistor) for amplifying the current of the charge accumulated in the respective photodiode, a respective MOS switch for shifting the charge accumulated in the respective photodiode to the gate electrode of the respective JFET, and a respective MOS switch that has an electrode connected to the gate of the respective JFET for initializing the gate potential of the JFET.

The multiplexer preferably comprises multiple MOS switches and a set of control lines. The MOS switches are preferably grouped in units of two or four, with a group of MOS switches connected to each vertical read-out line. The number of control lines preferably matches the number of MOS switches in a group. The gate electrodes of the MOS switches in a group are preferably individually connected to respective control lines.

The horizontal accumulator preferably comprises multiple groups of capacitors (one group for each vertical read-out line), a respective MOS switch for each capacitor, and control lines connected to the gate electrodes of the respective MOS switches. Preferably two or four capacitors are provided in each group, although this is not meant to be limiting. The gate electrodes of the MOS switches are preferably commonly connected in pairs to respective control lines.

The horizontal scanning means preferably comprises a horizontal shift register and one or more horizontal selection circuits. The horizontal scanning means provides timing signals to the control lines of the horizontal accumulator to sequentially connect the capacitors in the horizontal accumulator to the horizontal read-out lines.

The foregoing and additional features and advantages of the invention will be more readily apparent from the following detailed description, which proceeds with reference to the accompanying drawings.

DETAILED DESCRIPTION

This invention is described below in connection with multiple example embodiments which represent the current best mode of the invention.

Example Embodiment 1

Figure 1:
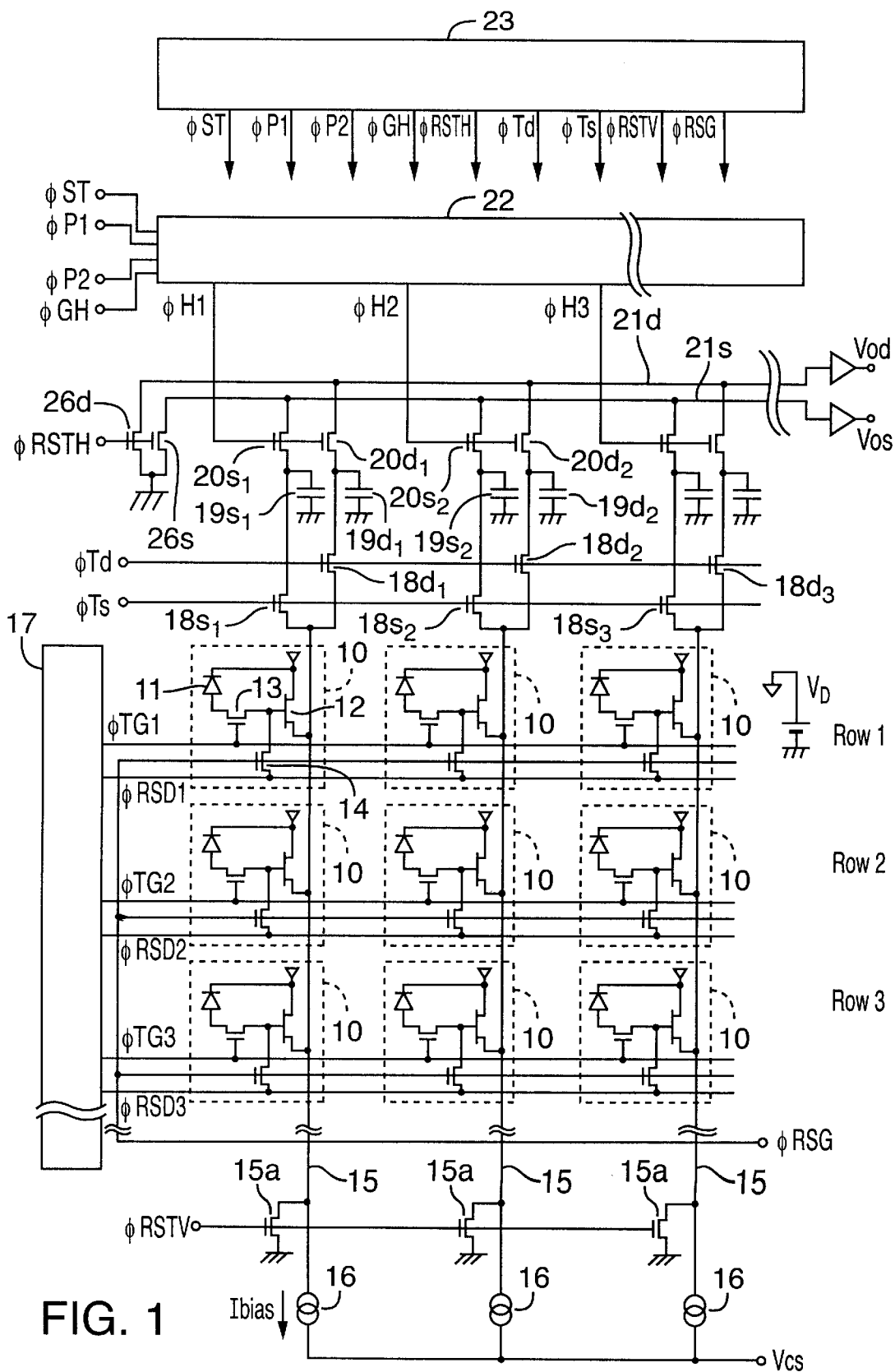
FIG. 1 is a schematic diagram showing an electrical circuit configuration for a solid-state image-pickup device according to a first example embodiment of the invention.

A schematic drawing showing the electrical circuit configuration of a solid-state image-pickup device according to this example embodiment is shown in FIG. 1.

In FIG. 1, multiple pixels 10 are arranged in a planar array of columns and rows. For simplicity, a representative 3×3 pixel configuration is shown; the actual devices according to this and all other example embodiments of the subject invention typically comprise tens of thousands of pixels. Each pixel 10 comprises a respective photodiode 11 for performing photoelectric conversion, a respective JFET (junction-type field-effect transistor) 12 for amplifying the current of the charge accumulated in the respective photodiode 11, a respective MOS switch 13 for shifting the charge accumulated in the respective photodiode 11 to the gate electrode of the respective JFET 12, and a respective MOS switch 14, that has a first electrode connected to the gate of the respective JFET 12 for initializing the gate potential of the JFET 12.

The gate electrodes of the MOS switches 13 are commonly connected in each horizontal line (row) of the pixel array to a respective horizontal line. Each of these horizontal lines is individually connected to respective control pulses ΦTG1, ΦTG2, . . . (ΦTG1 connected to the first horizontal line, ΦTG2 connected to the second horizontal line, etc.) which are output from a vertical scanning circuit 17.

Similarly, for a given horizontal line of pixels, the second electrodes of the MOS switches 14 are commonly connected to a respective horizontal line, with each horizontal line individually supplied with a respective control potential ΦRSD1, ΦRSD2, . . . output from the vertical scanning circuit 17. In addition, all of the gate electrodes of the MOS switches 14 in the entire pixel array are commonly connected and supplied with a control pulse ΦRSG.

The source electrodes of the JFETs 12 for the pixels in each vertical column of the pixel array are commonly connected to respective (one for each column) vertical read-out lines 15. A respective reset MOS switch 15a and respective bias current source 16 are connected to each vertical read-out line 15. The gate electrodes of the MOS switches 15a are commonly supplied with a control pulse ΦRSTV.

The output of each vertical read-out line 15 is connected to a respective pair of MOS switches 18s, 18d. The gate electrodes of the MOS switches 18s are all commonly connected, and supplied with a control pulse ΦTs. A control pulse ΦTd is supplied to the gate electrodes of the MOS switches 18d, which are also all commonly connected. Collectively, these MOS switches 18s, 18d and respective control lines form a multiplexer circuit.

Capacitors 19s, 19d respectively connected to the output terminals of the MOS switches 18s, 18d. By following each vertical read-out line 15 upward it can be seen that a respective pair of capacitors 19s, 19d is connected to each vertical read-out line 15; thus, these capacitors are marked 19$s_1$, 19$d_1$ (connected to the first vertical read-out line), 19$s_2$, 19$d_2$ (connected to the second vertical read-out line), etc.

Each pair of capacitors 19s, 19d is connected to respective horizontal scanning read-out lines 21s, 21d via a respective pair of horizontal scanning MOS switches 20s, 20d. The MOS switches are labeled 20$s_1$, 20$d_1$, 20$s_2$, 20$d_2$, etc., with the subscript numeral corresponding to the respective vertical read-out line. The gate electrodes of each pair of the MOS switches 20s, 20d are connected to respective control pulses ΦH1, ΦH2, . . . output from a horizontal scanning circuit 22.

Reset MOS switches 26s, 26d are connected to the respective horizontal read-out lines 21s, 21d. The gate electrodes of the reset MOS switches 26s, 26d are commonly connected to a reset control pulse ΦRSTH.

A controller 23 outputs control pulses ΦST, ΦP1, ΦP2, ΦGH, ΦRSTH, ΦTd, ΦTs, ΦRSTV, ΦRSG on output control lines. The output pulses serve as control signals for, inter alia, driving the horizontal scanning circuit 22, switching the multiplexer MOS switches 18s, 18d, resetting the horizontal read-out lines 21s, 21d, resetting the vertical read-out lines 15, and initializing the pixel 10 outputs. The controller 23 is connected to the foregoing circuit components via its output control lines. The controller 23 preferably has an internal clock and an appropriate array of logic gates, etc., to produce the various pulse outputs in a coordinated manner. The controller 23 can be integrated on the solid-state image-pickup device, or provided in a separate integrated circuit.

Figure 2:
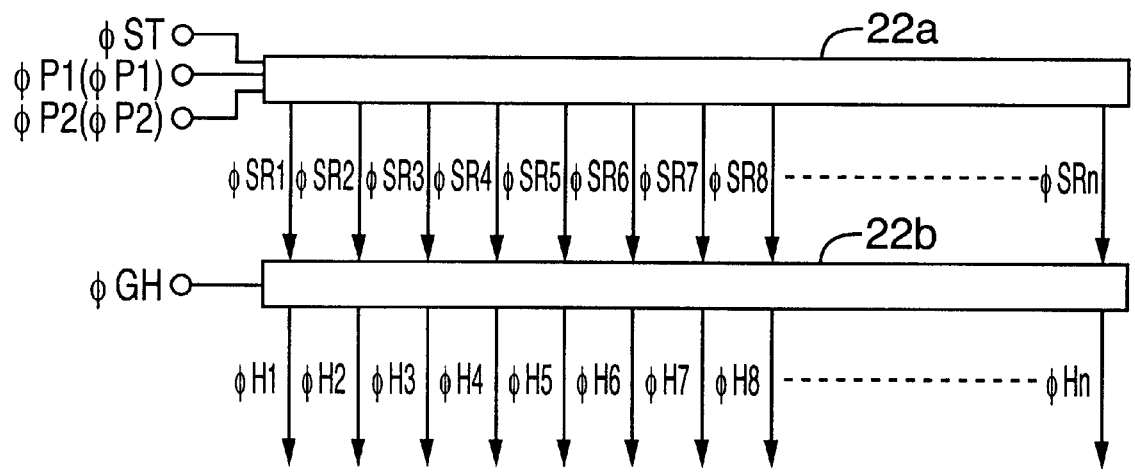
FIG. 2 is a schematic block diagram of the horizontal scanning circuit 22 of the FIG.-1 embodiment.

FIG. 2 is a schematic block diagram of the horizontal scanning circuit 22. As shown in FIG. 2, the horizontal scanning circuit 22 generally comprises two portions: a horizontal shift register 22a and a horizontal selection circuit 22b.

Figure 3:
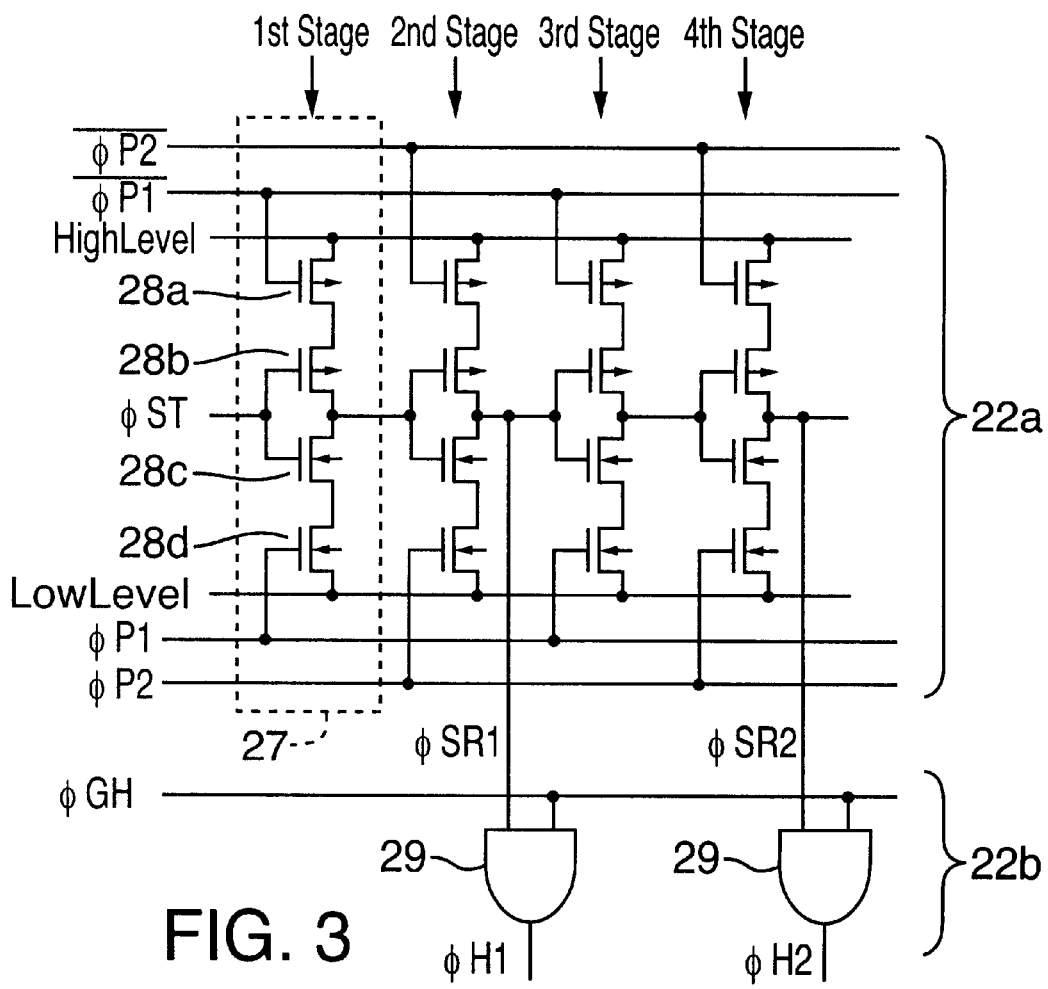
FIG. 3 is a schematic drawing showing the electrical circuit configuration of the horizontal scanning circuit 22 of FIGS. 1 and 2.

FIG. 3 is a schematic diagram showing the detailed circuit configurations of the horizontal shift register 22a and horizontal selection circuit 22b. As shown in FIG. 3, the horizontal shift register 22a is constructed by connecting multiple clocked CMOS circuits 27 in multiple stages.

Each individual clocked CMOS circuit 27 comprises four MOS switches 28a, 28b, 28c, 28d. The source of PMOS switch 28a is connected to a high-level voltage line, and the drain of PMOS switch 28a is connected to the source of PMOS switch 28b. The drain of PMOS switch 28b is connected to the drain of NMOS switch 28c, forming an output terminal. The gate of PMOS switch 28b is connected to the gate of NMOS switch 28c, forming an input terminal. In addition, the source of NMOS switch 28c is connected to the drain of NMOS switch 28d, and the source of NMOS switch 28d is connected to a low-level voltage line.

For the clocked CMOS circuits 27 that are positioned at odd-numbered stages, the inverse of the shift pulse ΦP1 is supplied to the gate of PMOS switch 28a, while the shift pulse ΦP1 is supplied to the gate of NMOS switch 28d. For the clocked CMOS circuits 27 that are positioned at even-numbered stages, the inverse of the shift pulse ΦP2 is supplied to the gate of PMOS switch 28a, while the shift pulse ΦP2 is supplied to the gate of NMOS switch 28d.

The clocked CMOS circuits operate as follows, with reference to the timing diagram shown in FIG. 4. Initially, all of the outputs from the clocked CMOS circuits 27 are low. A start pulse ΦST is supplied to the input terminal of the first-stage clocked CMOS circuit 27. In synchrony with the rising edge of the first shift pulse ΦP1, the first-stage output (which is the second-stage input) goes high. In synchrony with the rising edge of first shift pulse ΦP2, output of the second-stage clocked CMOS circuit 27, which is connected to the output ΦSR1, goes high. Subsequent shift pulses ΦP1, and ΦP2 cause this progression to continue to the right, with the output ΦSR$_n$ going high in synchrony with the rising edge of each nth shift pulse ΦP2, and returning to low in synchrony with the rising edge of the next shift pulse ΦP2. The outputs signals ΦSR1, ΦSR2, . . . from the horizontal shift register 22a then have their timing adjusted by an array of AND circuits 29 (FIG. 3) inside the horizontal selection circuit 22b, and are output as control pulses ΦH1, ΦH2, . . .

With this example embodiment, both high-resolution read-out and low-resolution read-out can be performed as discussed below.

High-resolution Read-out

Figure 4:
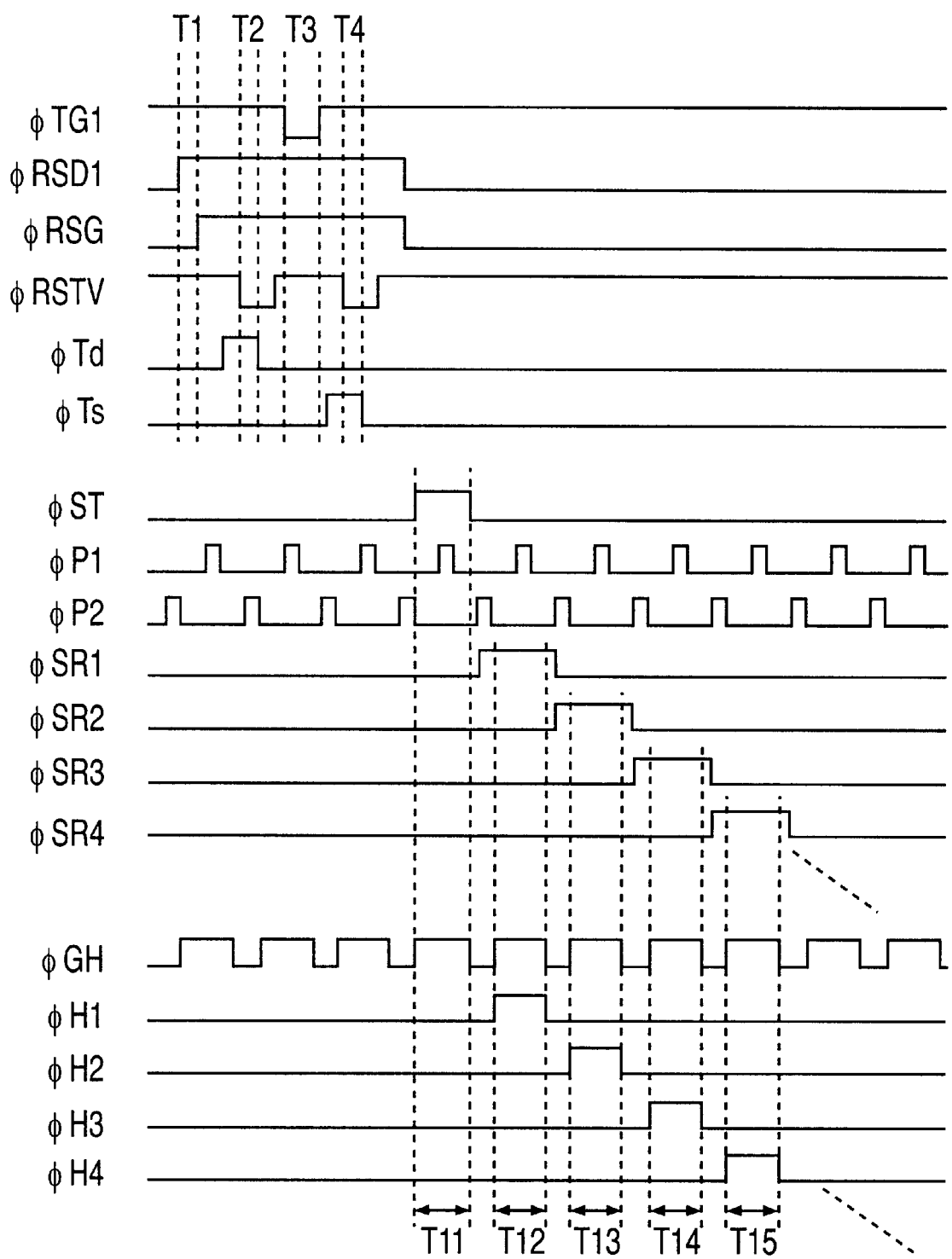
FIG. 4 is an operation timing chart during high-resolution read-out of the FIG.-1 embodiment.

FIG. 4 is the operation timing chart for Example Embodiment 1 when performing a high-resolution read-out.

At the start of timing period T1, ΦRSD1 is switched to a high potential bias voltage while ΦRSG is held at a low potential. This initializes the gate potentials of the JFETs 12 in the first horizontal line of pixels 10 (row 1) to a desired bias potential, while the gate electrodes of the remaining JFETs 12 (those not in row 1) are held at a low potential by ΦRSD2, ΦRSD3, . . . , (which remain low).

Just prior to the timing period T2, ΦTd is switched to high potential, followed by ΦRSTV being switched to low potential. As a result, the source follower output of the JFETs 12 in row 1 (representing the dark outputs (reference signal)) charge the capacitors 19d via the MOS switch 18d. Thus, the dark output signals generated by the pixels in the first horizontal line are respectively accumulated in the group of capacitors 19d.

At the start of timing period T3, ΦTG1 is switched to low potential, thereby causing the signal charges which have been photoelectrically converted by the photodiodes 11 in line 1 to be shifted to the gate electrodes of the JFETs 12 via the MOS switches 13.

Just prior to the start of the timing period T4, ΦRSTV is switched to low potential. As a result, the source follower output of the JFETs 12 in row 1 charge their respective capacitors 19s via the MOS switches 18s. Thus, the output signals generated by the pixels in the first horizontal line are respectively accumulated in the group of capacitors 19s.

A first vertical read-out period of the first horizontal line (row 1) of pixels is completed by the above series of steps (T1–T4).

Immediately following this vertical read-out period, a start pulse ΦST is supplied to the horizontal scanning circuit 22 corresponding to the start of timing period T11. The start pulse ΦST is a single elongated pulse that straddles a first periodic shift pulse ΦP1. The outputs ΦSR1, ΦSR2, . . . of the horizontal shift register 22a are sequentially set to high potential in synchrony with the rising edge of subsequent shift pulses ΦP2, which share the same cycle frequency as ΦP1.

The timing of the outputs ΦSR1, ΦSR2, . . . is adjusted by a periodic pulse ΦGH, that is cycled at the same frequency as the shift pulses ΦP1, ΦP2. These outputs then become control pulses ΦH1, ΦH2 that are impressed on the gates of the respective MOS switches 20s, 20d.

As a result, a signal from the first horizontal line, which has accumulated in the capacitors 19s, 19d, is scanned one pixel at a time in the horizontal direction by the MOS switches 20s, 20d and sequentially read out from horizontal read-out lines 21s, 21d.

A high-quality video signal can be produced by an external processing circuit (not shown) that determines the difference between the video signals Vos, Vod output by the horizontal read-out lines 21s, 21d.

One frame of video signal is read out at high resolution (normal resolution commensurate with the number of pixels 10) by repeating the horizontal line read-out process described above while vertically shifting the position of the horizontal line being read.

Low-resolution Read-out

Figure 5:
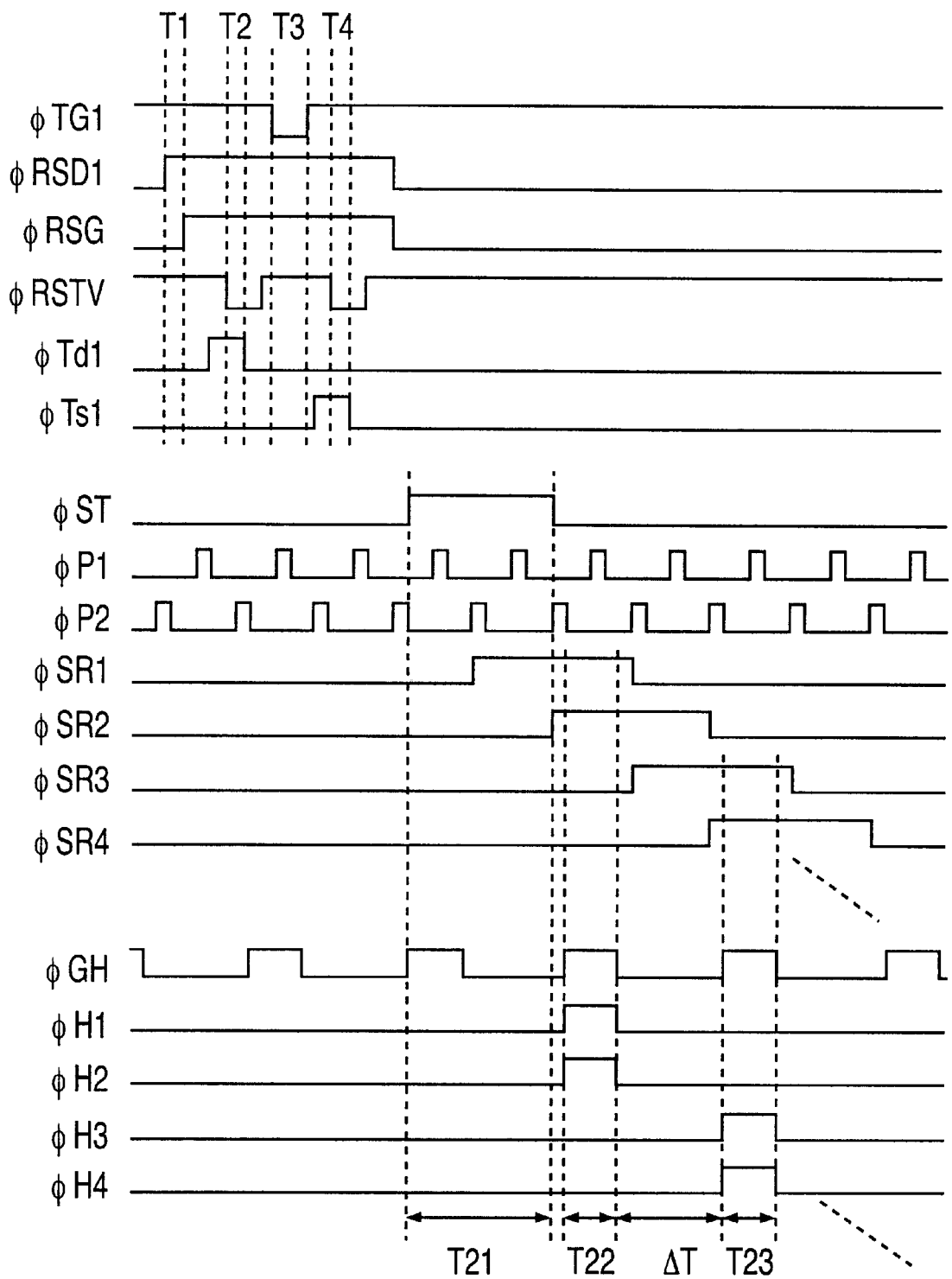
FIG. 5 is an operation timing chart during low-resolution read-out of the FIG.-1 embodiment.

FIG. 5 is the operation timing chart for Example Embodiment 1 when performing a low-resolution read-out.

First, as occurs during high-resolution read-out, the vertical read-out of the first horizontal line of pixels (row 1) is completed during the timing periods T1–T4. Immediately following the vertical read-out period, a start pulse ΦST is supplied to the horizontal scanning circuit 22 (see timing period T21). This start pulse ΦST is a single elongated pulse that straddles two of the shift pulses ΦP1.

Subsequent alternating shift pulses ΦP1, ΦP2 cause sequential high outputs on the signals ΦSR1, ΦSR2, . . . as occurred in the high-resolution mode described above. However, as shown in FIG. 5, these signals remain high for two cycles instead of the previous one cycle (as occurs in the high-resolution mode), with an overlap of one cycle. Additionally, the cycle period for periodic pulse ΦGH is also twice as long in this low-resolution mode.

As a result, a pair of control pulses ΦH1, ΦH2, . . . is simultaneously switched to high in synchrony with the rising edge of the periodic pulse ΦGH. This process is repeated for subsequent sequential pairs of control pulses ΦH1, ΦH2, . . . every two cycles.

When the control pulses ΦH1, ΦH2 are switched to high, the capacitors $19s_1$, $19s_2$, holding the output signals of the first and second vertical pixels in the first horizontal line, respectively, are simultaneously connected to the horizontal read-out line 21s. Additionally, the capacitors holding the dark signals of the first and second vertical pixels in the first horizontal line ($19d_1$, $19d_2$ respectively) are simultaneously connected to horizontal read-out line 21d.

When multiple capacitors are simultaneously connected to a read-out line, the capacitive charge held in each capacitor is dumped into the read-out line. By this process, the output signals of horizontally adjacent pixels are combined in pairs. Thus, a video signal in which the number of (displayed) horizontal pixels is decreased by half can be read out by repeating the horizontal line read-out process described above while vertically shifting the position of the horizontal line being read.

A high-quality video signal can be produced by an external processing circuit (not shown) that determines the difference between the video signals Vos, Vod output by the horizontal read-out lines 21s, 21d.

Figure 6:
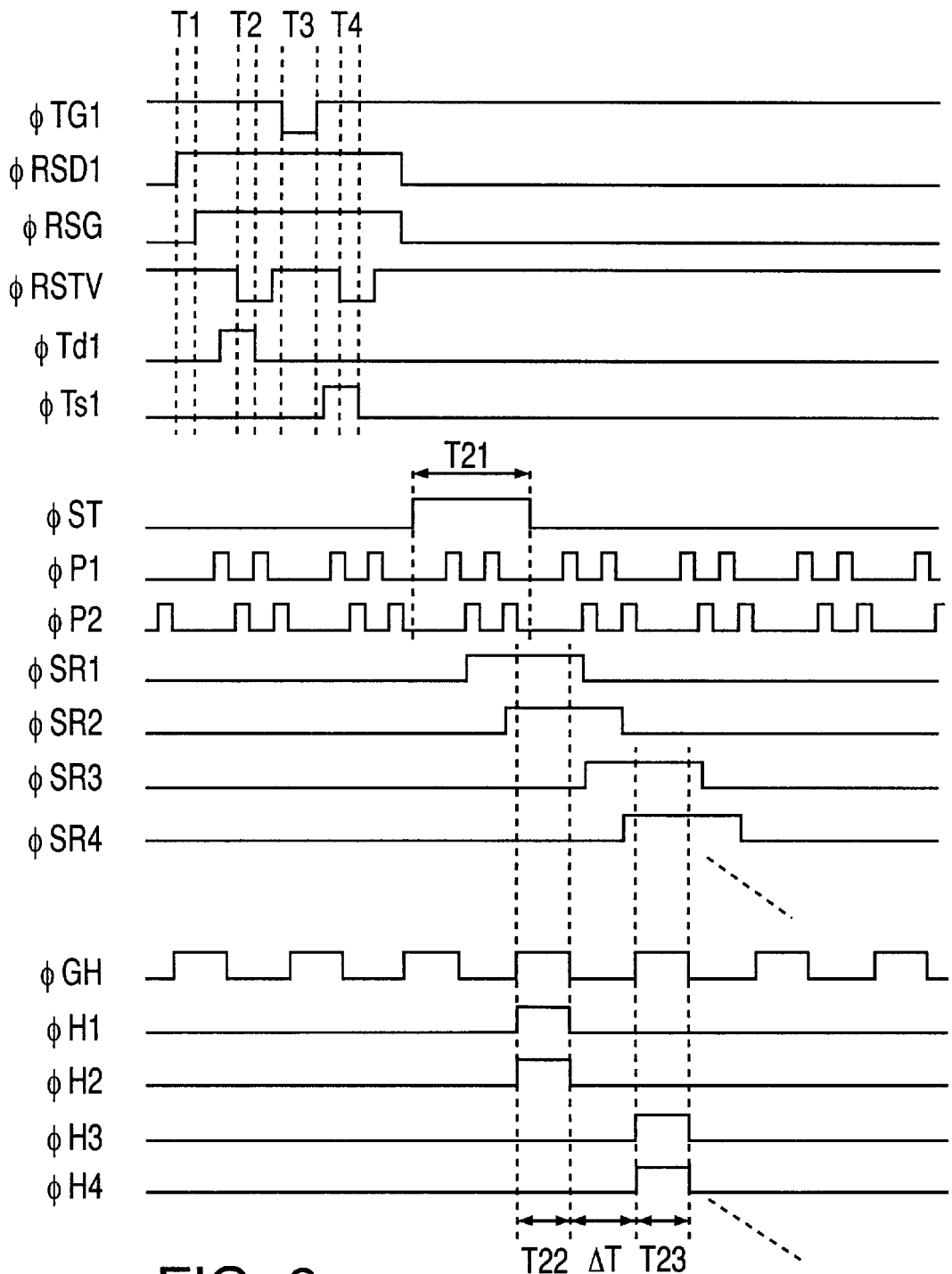
FIG. 6 is an operation timing chart during high-speed, low-resolution read-out of the FIG.-1 embodiment.

While operating in the low-resolution read-out mode, horizontal scanning is temporarily idle during an interval ΔT between the period T22 and the period T23 (see FIG. 5). The idle period ΔT can be reduced without adverse effects to the video signal output. FIG. 6 is a chart showing the drive timing when the interval ΔT has been reduced. As shown in FIG. 6, a shortening of the idle period ΔT can be accomplished by simply reducing the time interval between the shift pulses ΦP1, ΦP2.

For this example embodiment, normal high-resolution read-out can be achieved by performing horizontal scanning according to the drive timing shown in FIG. 4. Low-resolution high-speed read-out, suitable for applications such as monitor displays, etc., can be achieved by performing horizontal scanning according to the drive timing shown in FIG. 5 or FIG. 6. In particular, the low-resolution read-out operation can be executed at a higher speed by shortening the idle period ΔT according to the drive timing shown in FIG. 6. Such an operating mode reduces display-image flicker by shortening the single-frame read-out interval. In addition, the low-resolution video signal produced in this operating mode can be directly displayed on a monitor or viewfinder, eliminating the need for additional video processing circuits, etc., normally required to reduce the resolution of the video signal output from conventional solid-state image-pickup devices.

In the low-resolution operating mode of Example Embodiment 1, the number of horizontal pixels that are output to the video signal is reduced by half. However, other schemes are possible. In general, by simultaneously accumulating and scanning out the output signals of N horizontally-adjacent pixels, it is possible to reduce the number of vertical lines in the output signal to 1/N. For example, the start pulse ΦST input to a horizontal scanning circuit 22 can be configured as shown in FIG. 3 so as to straddle N shift pulses ΦP1.

Example Embodiment 2

Figure 7:
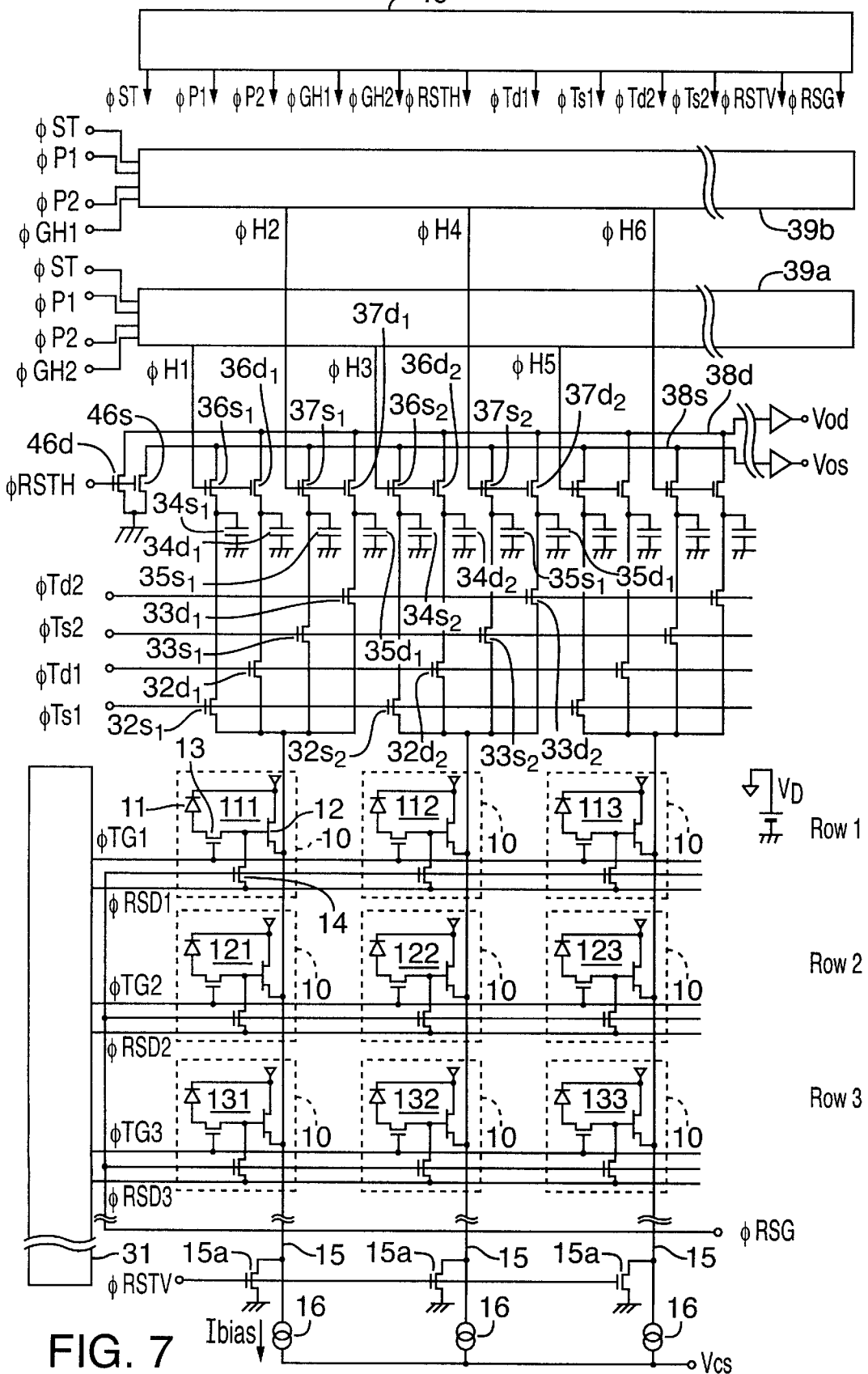
FIG. 7 is a schematic diagram showing an electrical circuit configuration for a solid-state image-pickup device according to a second example embodiment of the invention.

The electrical circuit configuration of a solid-state image-pickup device according to this example embodiment is schematically shown in FIG. 7. A comparison of FIG. 7 with FIG. 1 reveals that certain circuit components have the same reference designators and are similarly placed in both figures. These include the pixels 10, (each comprising a photodiode 11, a JFET 12, and MOS switches 13, 14); vertical read-out lines 15; reset MOS switches 15a; bias current sources 16; and signal lines corresponding to control pulse ΦRSG, respective control potentials ΦRSD1, ΦRSD2, ..., and respective control pulses ΦTG1, ΦTG2, ... These components serve the same functions in both of these example embodiments. For brevity, only the circuit elements that are different from those found in the Example Embodiment 1 are further discussed below.

As in Example Embodiment 1, the pixels 10 are arranged in a planar array of columns and rows. The pixels are numbered 111, 112, 113, 121, etc., so as to designate the row and column in which each pixel is located. (The second numeral represents the row, while the third numeral represents the column.) The outputs of the pixels in each vertical column are commonly connected to respective (one for each column) vertical read-out lines 15.

The outputs of the vertical read-out lines 15 are connected to the respective inputs of a multiplexer circuit comprising a respective set of MOS switches 32s, 32d, 33s, 33d for each vertical read-out line 15, and control pulses ΦTs1, ΦTd1, ΦTs2, ΦTd2.

The gate electrodes of the MOS switches 32s are all commonly connected to a control pulse ΦTs1. The gate electrodes of the MOS switches 32d also are all commonly connected to a control pulse ΦTd1. Similarly, the gate electrodes of the MOS switches 33s are all commonly connected to a control pulse ΦTs2, while the gate electrodes of MOS switches 33d also are all commonly connected to a control pulse ΦTd2.

The output terminals of each of the MOS switches 32s, 32d are respectively connected to capacitors 34s, 34d. Similarly, the output terminals of each of the MOS switches 33s, 33d, are respectively connected to capacitors 35s, 35d. The subscript numeral following each of the reference designators for these capacitors 34s, 34d, 35s, 35d denotes the respective vertical read-out line; e.g., $34s_1$ indicates that this capacitor holds charges supplied by the first vertical read-out line 15.

The capacitors 34s, 34d are each respectively connected to horizontal read-out lines 38s, 38d via horizontal scanning MOS switches 36s, 36d. Also, the capacitors 35s, 35d are each respectively connected to horizontal read-out lines 38s, 38d via horizontal scanning MOS switches 37s, 37d. (The subscript numerals denote the corresponding read-out lines.)

The gate electrodes for each pair of MOS switches $36s_x$, $36d_x$ are commonly connected to respective control pulses ΦH1, ΦH3, ΦH5, ... that are sequentially output from a horizontal scanning circuit 39a. Similarly, the gate electrodes for each pair of MOS switches $37s_x$, $37d_x$ are commonly connected to respective control pulses ΦH2, ΦH4, ΦH6, ... that are sequentially output from a horizontal scanning circuit 39b. Each of the horizontal scanning circuits 39a, 39b comprises a horizontal shift register and a horizontal selection circuit, as shown in FIG. 2. In addition, the reset MOS switches 46s, 46d are respectively connected to the horizontal read-out lines 38s, 38d. The gate electrodes of these MOS switches 46s, 46d are commonly supplied with a reset control pulse ΦRSTH.

A controller 40 outputs control pulses ΦST, ΦP1, ΦP2, ΦGH1, ΦGH2, ΦRSTH, ΦTd1, ΦTs1, ΦTd2, ΦTs2, ΦRSTV, ΦRSG on output control lines. The output pulses serve as control signals for, inter alia, driving the horizontal scanning circuits 39a, 39b, switching the multiplexer MOS switches 32s, 32d, 33s, 33d, resetting the horizontal read-out lines 38s, 38d, resetting the vertical read-out lines 15, and initializing the pixel 10 outputs. The controller 40 is connected to the foregoing circuit components via its output control lines. The controller 40 is similar to the controller 23 discussed above in Example Embodiment 1.

As with the first example embodiment, this embodiment permits both high-resolution read-out and low-resolution read-out, as described below.

High-resolution Read-out

Figure 8:
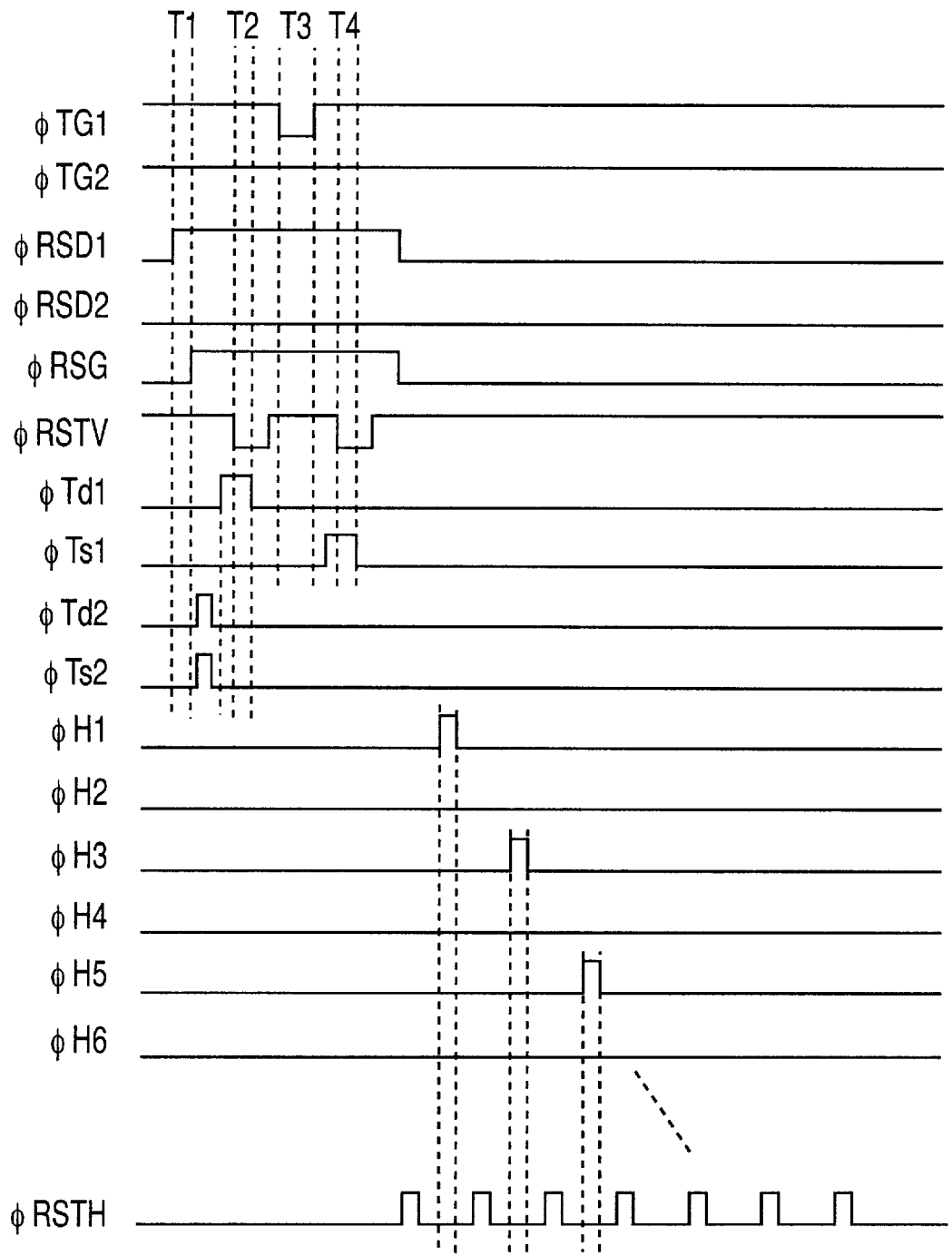
FIG. 8 is an operation timing chart during high-resolution read-out of the FIG.-7 embodiment.

FIG. 8 is an operation timing chart for this second example embodiment when operating in the high-resolution read-out mode.

As shown in FIG. 8, during timing periods T1–T4 the output signals from the pixels in row 1 are accumulated in the groups of capacitors 34s, 34d. Immediately following this vertical read-out operation, a start pulse ΦST is provided to one of the horizontal scanning circuits 39a, and the odd-numbered control pulses ΦH1, ΦH3, ΦH5, ... are sequentially set to high during timing periods T41, T42, T43, ..., respectively. Meanwhile, the control pulses ΦH2, ΦH4, ... are held at low level. This is accomplished by not providing the horizontal scanning circuit 39b with either the start pulse ΦST, shift pulses ΦP1, ΦP2, or periodic pulse ΦGH. As a result, the signal from the first horizontal line, which has accumulated in the capacitors 34s, 34d, is scanned one pixel at a time in the horizontal direction by the MOS switches 36s, 36d and sequentially read out from the horizontal read-out lines 38s, 38d.

A high-quality video signal can be produced by an external processing circuit (not shown) that determines the difference between the video signals Vos, Vod output by the horizontal read-out lines 38s, 38d.

A video signal corresponding to one frame is read out at high resolution (normal resolution commensurate with the number of pixels 10) by repeating the horizontal line read-out process described above while vertically shifting the position of the horizontal line being read.

Low-resolution Read-out

Figure 9:
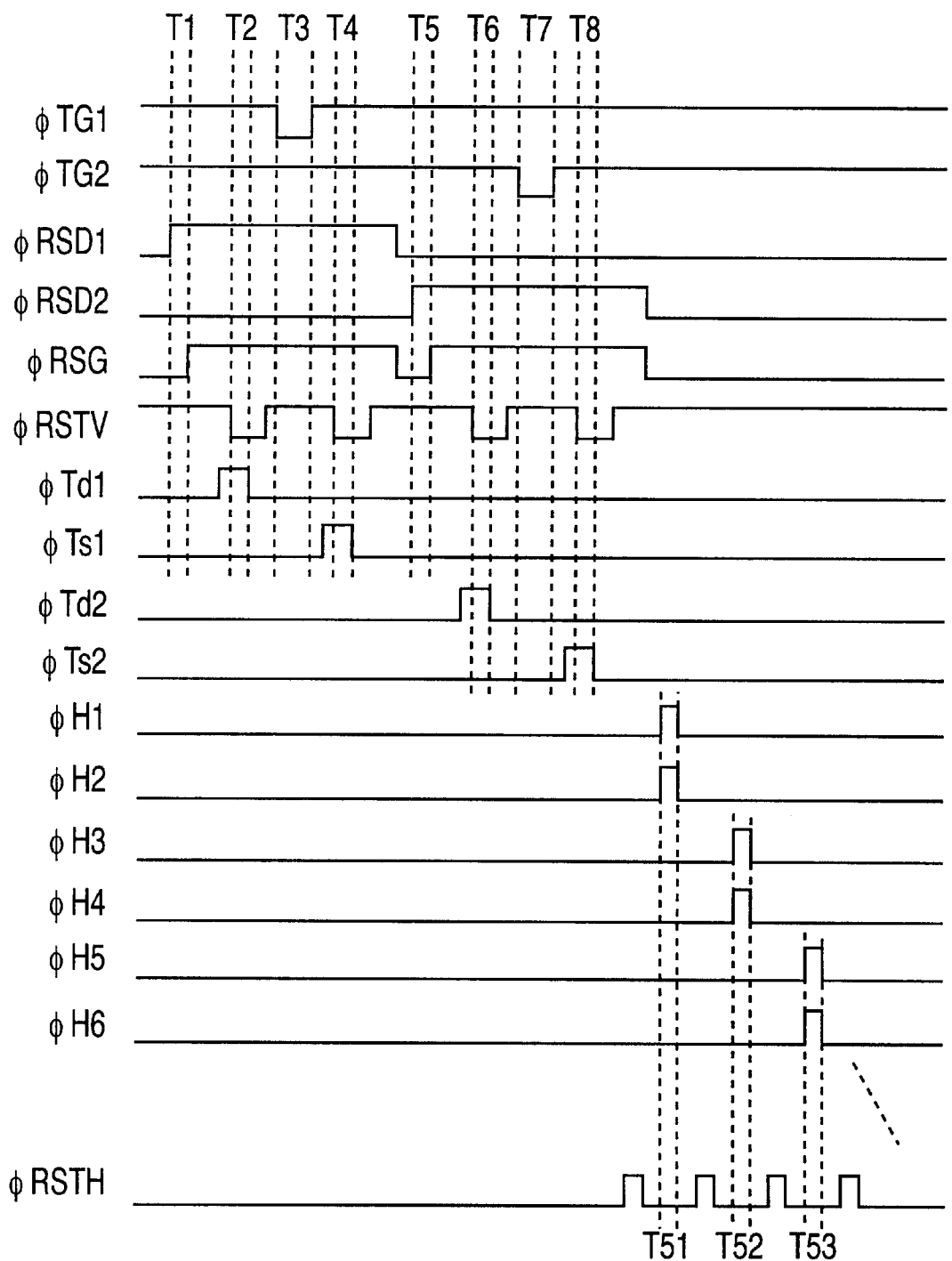
FIG. 9 is an operation timing chart for an operating mode of the FIG.-7 embodiment in which the number of vertical pixels in the video output is decreased.

FIG. 9 is an operation timing chart for this example embodiment when operating in a low-resolution read-out mode.

First, as during high-resolution read-out, the pixel output signals of the first horizontal line are accumulated during low-resolution read-out in the group of capacitors 34s, 34d during the time periods T1–T4. The pixel output signals of the second horizontal line are subsequently accumulated in the group of capacitors 35s, 35d during the timing periods T5–T8.

After vertical read-out of two horizontal lines is completed, a start pulse ΦST is simultaneously provided to the horizontal scanning circuits 39a, 39b. The timing operations of the scanning circuits 39a, 39b are similar to the timing operations of the scanning circuit 22 of the Example Embodiment 1 operating in the high-resolution mode (see FIG. 4). For simplicity, only the timing signals of the outputs from the scanning circuits 39a, 39b are shown in FIG. 9. (The timing for signals ΦST, ΦP1, ΦP2, are as shown in FIG. 4; the timing for periodic pulses ΦGH1, ΦGH2 match that shown for ΦGH.)

Subsequent to receiving the start pulse ΦST, the control pulses ΦH1 and ΦH2 are both set to high, as indicated by the timing period T51, and the capacitors 34s, 35s are simultaneously connected to the horizontal read-out line 38s.

Similarly, the capacitors 34d, 35d are simultaneously connected to the horizontal read-out line 38d. Thus, the output signals from vertically adjacent pairs of pixels are combined. The resulting two-vertical-pixel signal is sequentially scanned and output from the horizontal read-out lines 38s, 38d by sequentially setting respective control pulse pairs ΦH3, ΦH4, . . . , high.

A high-quality video signal can be produced by an external processing circuit (not shown) that determines the difference between the video signals Vos, Vod output by the horizontal read-out lines 38s, 38d.

Figure 10:
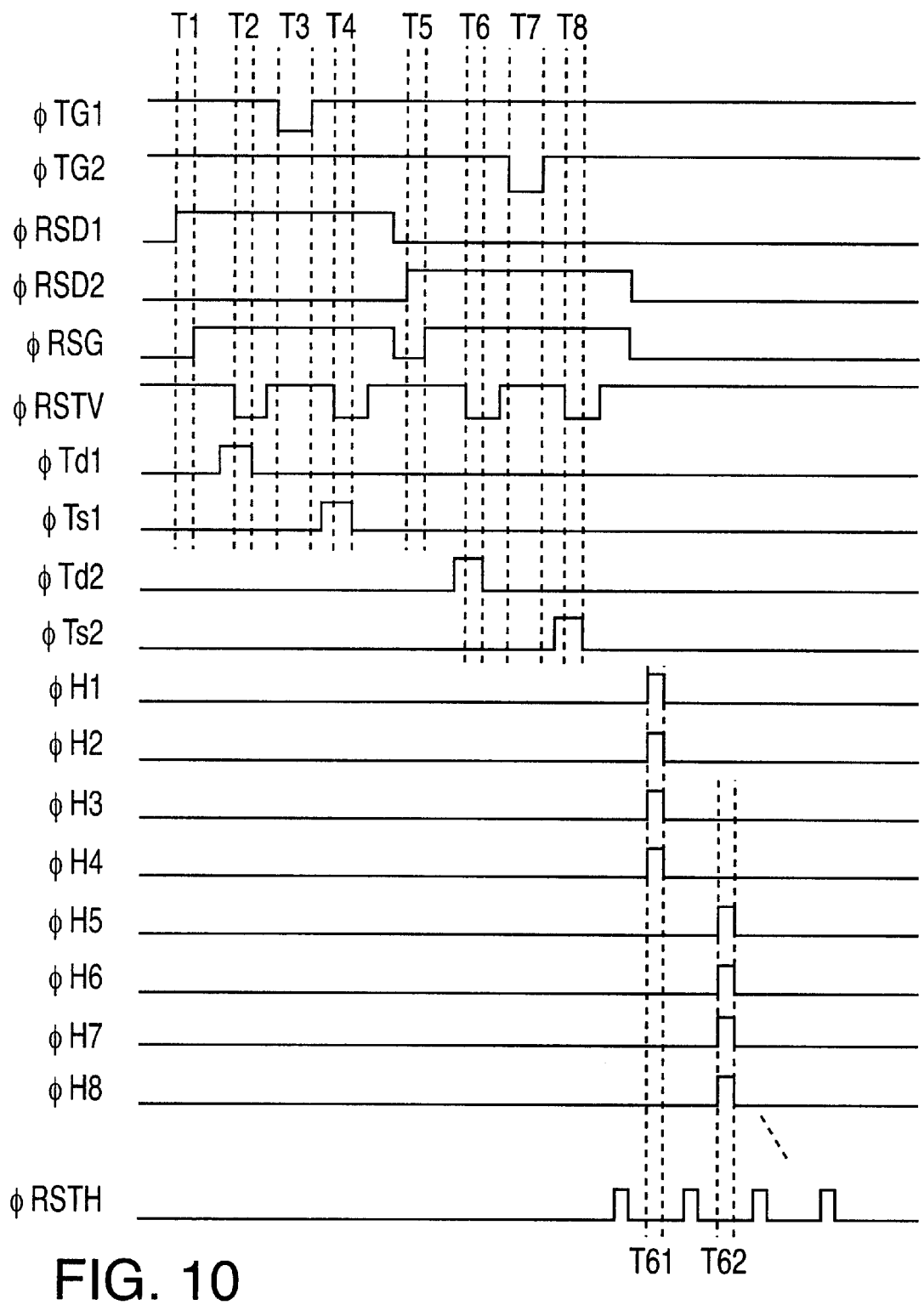
FIG. 10 is an operation timing chart for an operating mode of the FIG.-7 embodiment in which the number of horizontal pixels and the number of vertical pixels in the video output are decreased.

A video signal in which the number of horizontal lines is decreased by half can be read out by repeating the horizontal line read-out process described above while vertically shifting two horizontal lines at a time. FIG. 10 is an operation timing chart corresponding to an operational mode of this example embodiment in which both the number of horizontal pixels and the number of vertical pixels are decreased.

First, as in high-resolution read-out, the pixel output signals of the first horizontal line are accumulated in the group of capacitors 34s, 34d during the periods T1–T4. Subsequently, the pixel output signals of the second horizontal line are accumulated in the group of capacitors 35s, 35d during the periods T5–T8.

After vertical read-out of the output signal from two horizontal lines, a start pulse ΦST that straddles two shift pulses ΦP1 is simultaneously provided to the horizontal scanning circuits 39a, 39b. As a result, the control pulses ΦH1–ΦH4 are all set to high, as indicated by timing the period T61. When this occurs, the capacitors $34s_1$, $35s_1$ (output signals from pixels 111, 121, respectively) and capacitors $34s_2$, $35s_2$ (outputs signals from pixels 112, 122, respectively) are simultaneously connected to the horizontal read-out line 38s, and the capacitors $34d_1$, $35d_1$ (dark signal outputs from pixels 111, 121, respectively) and the capacitors $34d_2$, $35d_2$ (dark signal outputs from pixels 112, 122, respectively) are simultaneously connected to the horizontal read-out line 38d. As a result, the output signals produced by four adjacent pixels (2 horizontal pixels×2 vertical pixels) are combined. The combined four-pixel output signals are sequentially scanned and output from the horizontal read-out lines 38s, 38d by repeating the read-out sequence starting with the time period T62.

A high-quality video signal can be produced by an external processing circuit (not shown) that determines the difference between the video signals Vos, Vod output by the horizontal read-out lines 38s, 38d.

A video signal in which the number of horizontal lines is decreased by half and the number of vertical lines is decreased by half can be read out by repeating the horizontal line read-out process described above while vertically shifting two horizontal lines at a time.

A normal high-resolution read-out can be achieved with this example embodiment by performing horizontal scanning according to the drive timing shown in FIG. 8. Low-resolution high-speed read-out suitable for applications such as monitor displays, etc., can be achieved by performing horizontal scanning according to the drive timing shown in FIG. 9 or FIG. 10.

During low-resolution operations the number of pixels that must be read out per frame is reduced by the number of adjacent pixels that are combined into each single output signal. This facilitates faster frame updating; consequently, the single frame refresh interval is reduced, making it possible to more smoothly display movement of the photographic subject.

In addition, since a low-resolution video signal can be obtained directly from the solid state image-pickup device, the need for a video processing circuit for converting the video signal to low-resolution for monitor display is eliminated, thereby reducing costs and complexity.

With this and other example embodiments disclosed herein, it is possible to adjust the aspect ratio of the video signal by selectively reducing the number of horizontal and/or vertical pixels displayed in the output signal. An example is represented by a solid-state image-pickup device having a pixel aspect ratio (horizontal pixels vs. vertical pixels) of 1.6. Reducing the number of horizontal pixels in the output signal by half reduces the pixel aspect ratio of the (output) video signal to 0.8, which is much closer to 1 (a common aspect ratio for viewfinder displays).

The low-resolution operating mode described above for this example embodiment (corresponding to the drive timing shown in FIG. 9), wherein the number of horizontal lines read out was decreased by half, is not meant to be limiting. For instance, by providing capacitor rows to accumulate pixel output signals from M horizontal lines and collectively reading out M vertically adjacent horizontal lines at a time, it is possible to produce a video signal in which the number of horizontal lines per frame is decreased to 1/M.

The discussion above regarding the drive timing in FIG. 10, wherein the number of horizontal lines read out was decreased by half and the number of vertical lines read out was decreased by half, is not meant to be limiting. For instance, additional capacitors can be provided to accumulate pixel output signals from M horizontal lines, and combined output signals from (N horizontal pixels×M vertical pixels) can be read out to the horizontal read-out lines. Drive timing analogous to that shown in FIG. 10 makes it possible to decrease the number of horizontal lines being output to 1/M and to decrease the number of vertical lines being displayed to 1/N.

Figure 11:
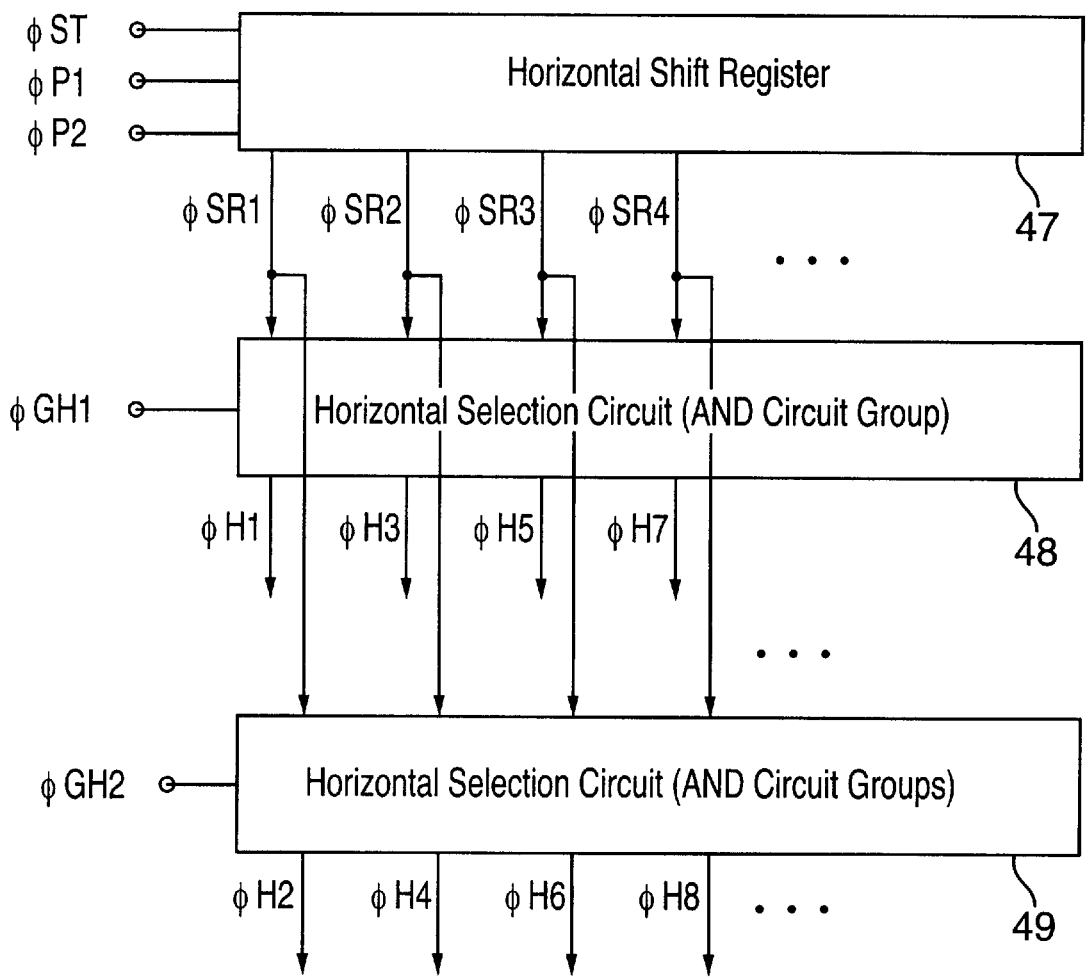
FIG. 11 is a drawing showing an example of a horizontal scanning circuit of the FIG.-7 embodiment.

The foregoing description in which the horizontal scanning circuits 39a, 39b, were constructed from a horizontal shift register and a horizontal selection circuit is not meant to be limiting. Generally, these horizontal scanning circuits 39a, 39b need only be pulse-generating circuits that output control pulses ΦH1, ΦH2, . . . according to a timing sequence as shown in FIGS. 8–10. For instance, FIG. 11 shows a horizontal scanning circuit that comprises a single horizontal shift register circuit 47 and two horizontal selection circuits 48, 49 that respectively coordinate the shift outputs ΦSR1, ΦSR2, . . . of the horizontal shift register circuit. In this horizontal scanning circuit, the control pulses ΦH1, ΦH3, ΦH5, . . . (FIG. 8) can be obtained by disabling the output of one of the horizontal selection circuits. In addition, the control pulses ΦH1, ΦH2, . . . (FIG. 9) can be obtained by enabling the outputs of both horizontal selection circuits. The control pulses ΦH1, ΦH2, ΦH3, ΦH4, . . . (FIG. 10) can be obtained by manipulating the start pulse ΦST to temporally overlay the shift output from the shift register circuits, while enabling the outputs of both of the horizontal selection circuits.

Example Embodiment 3

Figure 12:
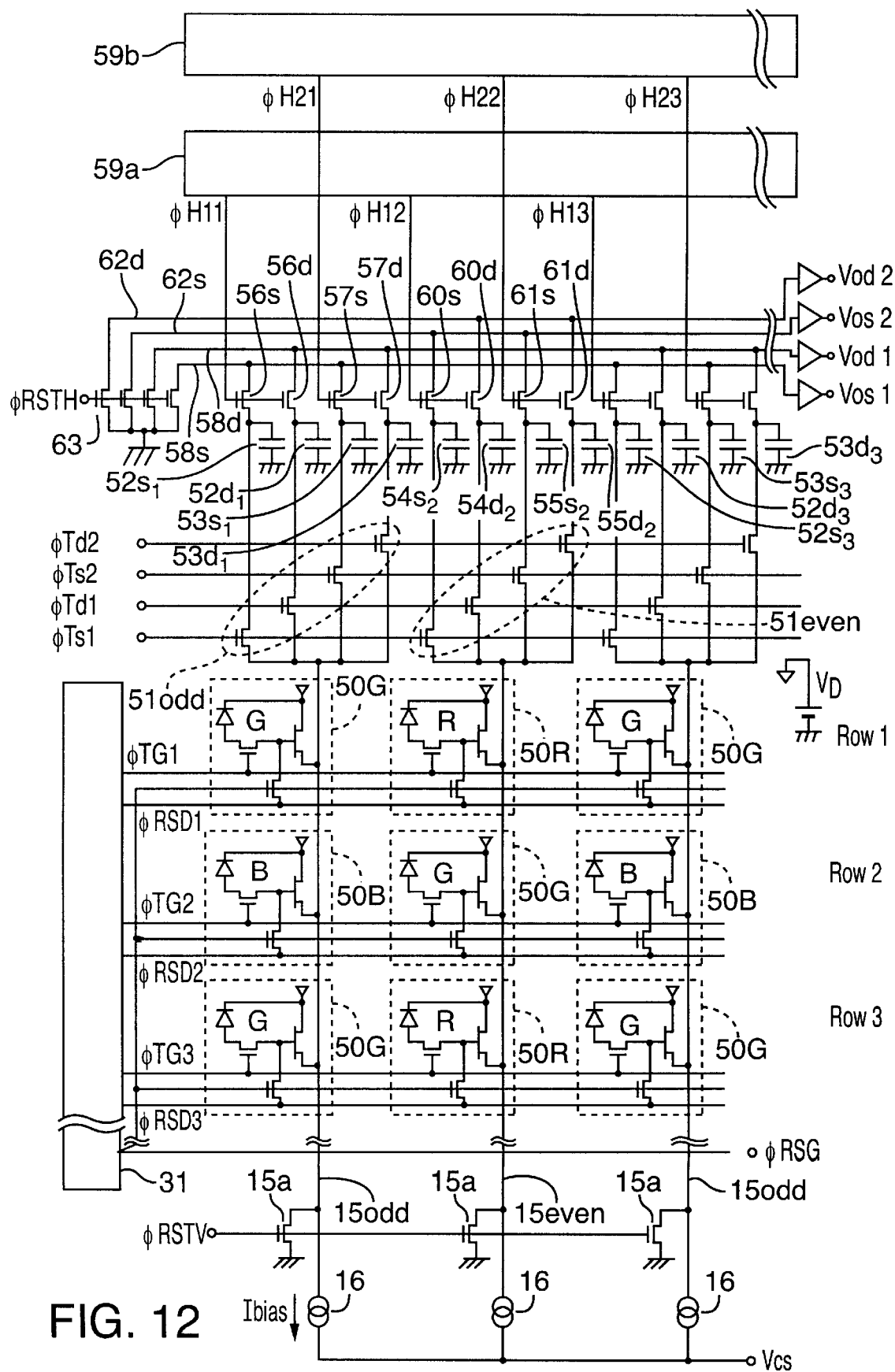
FIG. 12 is a schematic diagram showing an electrical circuit configuration for a solid-state image-pickup device according to a third example embodiment of the invention.

A schematic drawing showing the electrical circuit configuration of a solid-state image-pickup device according to this example embodiment is shown in FIG. 12. This embodiment is especially directed to producing color video signals. As with Example Embodiments 1 and 2, many circuit components of the FIG. -12 embodiment share common reference designators with those shown in FIG. 1 (pertaining to Example Embodiment 1). The pixels 10 in Example Embodiment 1 have been replaced in FIG. 12 by pixels 50G, 50R, and 50B, each comprising a respective photodiode 11, a respective JFET 12, and respective MOS switches 13, 14.

Other common components include vertical read-out lines 15; reset MOS switches 15a; bias current sources 16; and signal lines corresponding to control pulse ΦRSG, respective control potentials ΦRSD1, ΦRSD2, ..., and respective control pulses ΦTG1, ΦTG2, .... These components serve the same functions as described in Example Embodiment 1. For brevity, only the circuit elements that are different from those found in Example Embodiment 1 are further discussed below.

As shown in FIG. 12, the pixels 50 (50G, 50R, 50B for green, red, and blue light, respectively) are arranged in a planar array of columns and rows. These pixels are arranged in an alternating pattern, wherein no two horizontally or vertically adjacent pixels are dedicated to the same color. In this arrangement, the green pixels 50G are diagonally connected throughout the array, and the remaining positions are filled by alternating rows of red pixels 50R and blue pixels 50B.

RGB color filters (not shown) are arranged in a Bayer array sequence above the pixels 50. The outputs of the pixels 50 in each vertical column are commonly connected to respective vertical read-out lines 15.

The termini of the odd-numbered vertical read-out lines $15_{odd}$ are connected to respective multiplexers $51_{odd}$ that distribute the output signals to four respective output destinations. Similarly, the termini of the even-numbered vertical read-out lines $15_{even}$ are connected to respective multiplexers $51_{even}$ that distribute the output signals from each such read-out line to four respective output destinations.

Control pulses ΦTs1, ΦTd1, ΦTs2, ΦTd2 for controlling the output destinations of signals from the multiplexers are commonly connected to the gate electrodes of respective MOS switches in the multiplexers $51_{odd}$, $51_{even}$.

Capacitors $52s_1$, $52d_1$, $53s_1$, $53d_1$, $52s_3$, $52d_3$, $53s_3$, $53d_3$, ..., are respectively connected to the individual output destinations of the multiplexer $51_{odd}$, and capacitors $54s_2$, $54d_2$, $55s_2$, $55d_2$, $54s_4$, $54d_4$, $55s_4$, $55d_4$, ..., are respectively connected to the individual output destinations of the multiplexer $51_{even}$. The capacitors $52s_1$, $53s_1$, $52s_3$, $53s_3$, ..., are connected to the horizontal read-out line 58s via respective horizontal scanning MOS switches 56s, 57s; the capacitors $52d_1$, $53d_1$, $52d_3$, $53d_3$, ..., are each connected to the horizontal read-out line 58d via respective horizontal scanning MOS switches 56d, 57d; the capacitors $54s_2$, $55s_2$ are each connected to the horizontal read-out line 62s via respective horizontal scanning MOS switches 60s, 61s; and the capacitors $54d_2$, $55d_2$ are each connected to the horizontal read-out lines 62d via respective horizontal scanning MOS switches 60d, 61d.

The commonly connected gate electrodes of the MOS switch pairs 56s, 56d and 60s, 60d are respectively connected to control pulses ΦH11, ΦH12, ..., output from a horizontal scanning circuit 59a. Similarly, the commonly connected gate electrodes of MOS switch pairs 57s, 57d and 61s, 61d are respectively connected to control pulses ΦH21, ΦH22, ..., output from a horizontal scanning circuit 59b. This scheme is repeated from the gate electrodes of subsequent MOS switch pairs.

A reset MOS switch group 63 is connected to each of the horizontal read-out lines 58s, 58d, 62s, 62d. The gate electrodes of the MOS switch group 63 are commonly connected to a reset control pulse ΦRSTH.

A controller (not shown) can be utilized to provide control pulses serving as control signals for driving various circuit components. Such a controller can be similar to the controller 23 of Example Embodiment 1.

Figure 13:
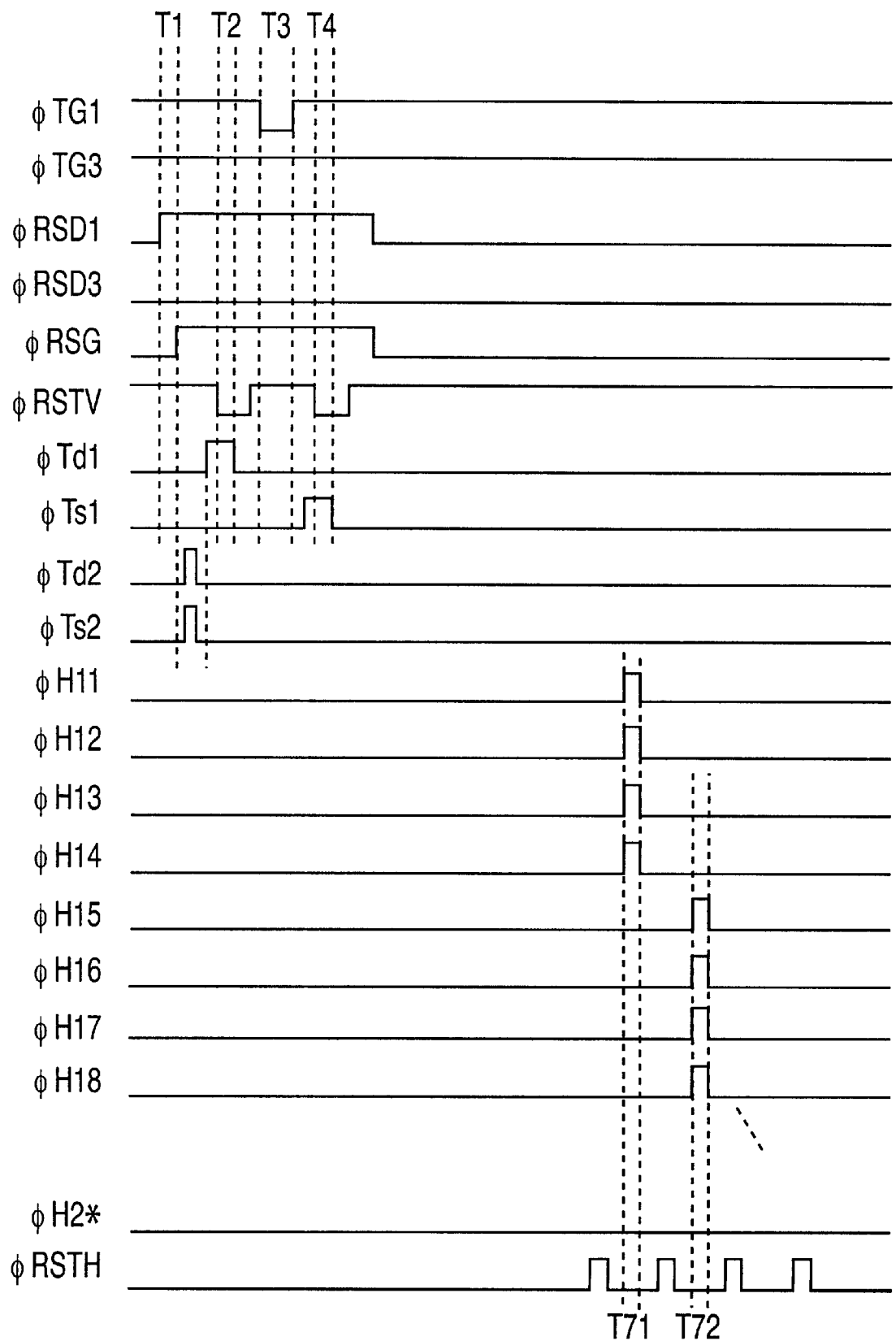
FIG. 13 is an operation timing chart for an operating mode of the FIG.-12 embodiment in which the number of horizontal pixels is decreased in color units.

FIG. 13 is an operation timing chart for when the number of horizontal pixels is decreased. First, as in the timing periods T1–T4 of FIG. 13, the outputs of the pixels in row 1 are accumulated in the group of capacitors $52s_1$, $52d_1$, $54s_2$, $54d_2$, $52s_3$, $52d_3$, .... Next, in the timing period T71, the horizontal scanning circuit 59a sets control pulses ΦH11, ΦH12, ΦH13, ΦH14 all to high. When this occurs, the capacitors $52s_1$, $52s_3$ corresponding to the signal outputs of the pixels in the first and third columns, respectively, are simultaneously connected to the horizontal read-out line 58s. Similarly, the capacitors $52d_1$, $52d_3$ corresponding to the dark outputs of the pixels in the first and third columns, respectively, are simultaneously connected to the horizontal read-out line 58d. As a result, the G outputs of the first and third pixels in row 1 are combined, forming a single signal that is distributed out via the horizontal read-out lines 58s, 58d. Simultaneously, the capacitors $54s_2$, $54s_4$ corresponding to the signal outputs of the pixels in the second and the fourth columns, respectively, are simultaneously connected to the horizontal read-out line 62s, and the capacitors $54d_2$, $54d_4$ corresponding to the dark outputs of the pixels in the second and the fourth columns, respectively, are simultaneously connected to the horizontal read-out line 62d. As a result, the R outputs of the second and fourth pixels in row 1 are combined, forming a single signal that is distributed out via the horizontal read-out lines 62s, 62d.

By repeating similar operations from period T72 on, the output signals from pairs of horizontally-adjacent pixels of the same color designation are simultaneously output in parallel from the horizontal read-out lines 58s, 58d, 62s, 62d.

A high-quality video signal can be produced by an external processing circuit (not shown) that determines the difference between the video signals Vos1, Vod1, Vos2, Vod2 output by the horizontal read-out lines 58s, 58d, 62s, 62d.

A video signal in which the number of horizontal pixels is decreased by half can be read out by repeating the horizontal line read-out sequence described above while sequentially shifting the position of the horizontal line being read in the vertical direction.

Figure 14:
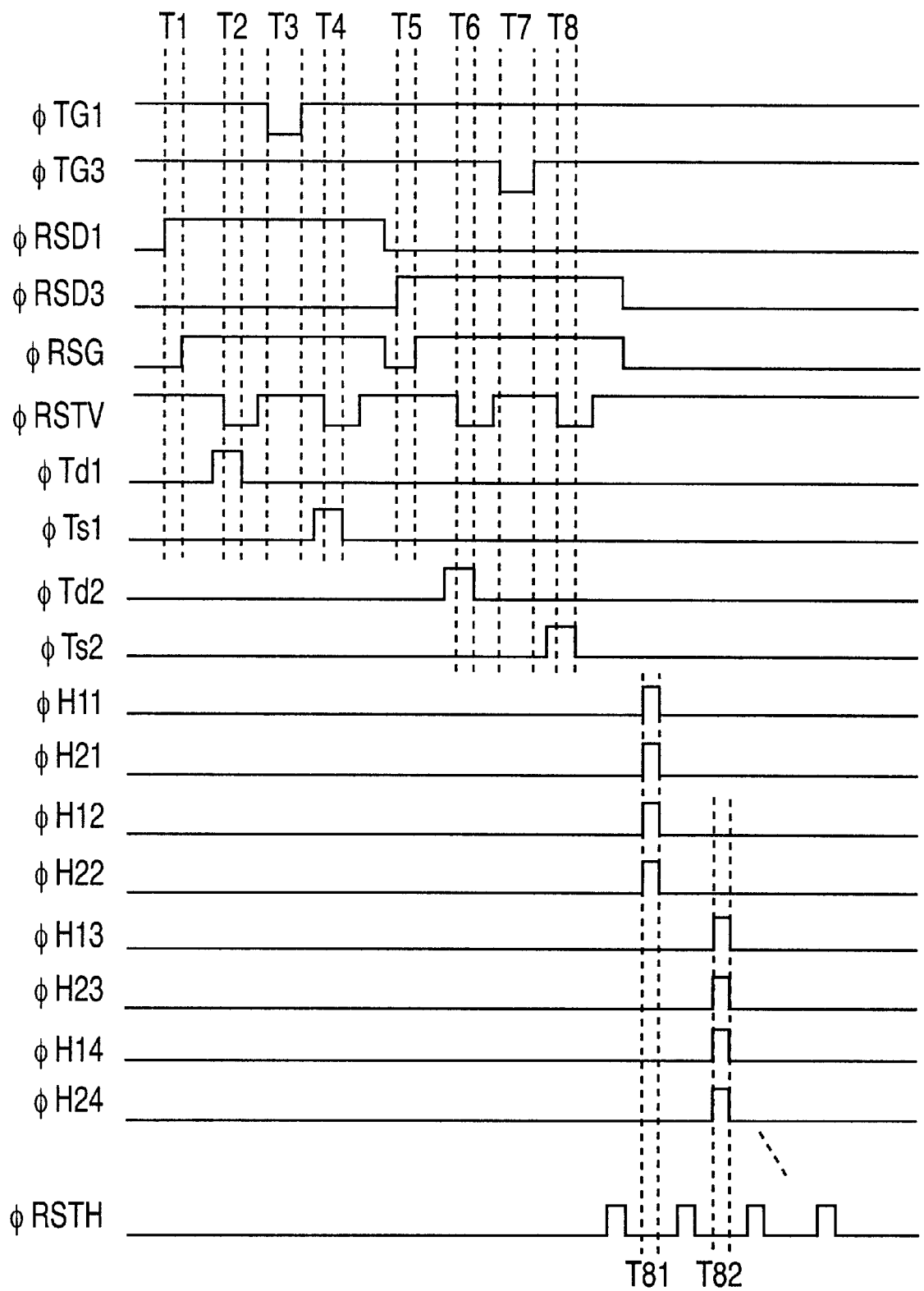
FIG. 14 is an operation timing chart for an operating mode of the FIG.-12 embodiment in which the number of vertical pixels is decreased in color units.

FIG. 14 is an operation timing chart for an operational mode that reduces the number of horizontal lines being read out. First, the outputs of the row-1 pixels are accumulated in the group of capacitors 52s, 52d, 54s, 54d, during the timing periods T1–T4. Subsequently, the outputs of the row-3 pixels are accumulated in the group of capacitors 53s, 53d, 55s, 55d during the timing periods T5–T8.

After vertical read-out is completed for two rows of pixels, the horizontal scanning circuits 59a, 59b set the control pulses ΦH11, ΦH21, ΦH12, ΦH22 all to high during the timing period T81. At this moment, the capacitors 52s, 53s are simultaneously connected to the horizontal read-out line 58s. Similarly, the capacitors 52d, 53d are simultaneously connected to the horizontal read-out line 58d, causing the G outputs of the first pixels in row 1 and row 3 to be added, forming a single signal that is distributed out via the horizontal read-out lines 58s, 58d. Also, at this time, the capacitors 54s, 55s are simultaneously connected to the horizontal read-out line 62s, and the capacitors 54d, 55d are simultaneously connected to the horizontal read-out line 62d, causing the R outputs of the second pixels in rows 1 and 3 to be added, and forming a single signal that is distributed out via the horizontal read-out lines 62s, 62d.

By repeating similar operations from period T82 on, the output signals from pairs of vertically-adjacent pixels of the same color designation are simultaneously output in parallel from the horizontal read-out lines 58s, 58d, 62s, 62d.

A high-quality video signal can be produced by an external processing circuit (not shown) that determines the difference between the video signals Vos1, Vod1, Vos2, Vod2 output via the horizontal read-out lines 58s, 58d, 62s, 62d.

A color video signal in which the number of horizontal lines is decreased by half can be read out by repeating the horizontal line read-out process described above while shifting the position of the horizontal lines being read in the vertical direction.

In the foregoing description of drive timing as shown in FIG. 13, the number of horizontal pixels was decreased by half. It will be understood that number of horizontal pixels can be decreased to 1/N by simultaneously reading out N horizontal pixels of the same color to the horizontal read-out lines.

In the foregoing description of drive timing as shown in FIG. 14, the number of horizontal lines was decreased by half. Again, it will be understood that the number of horizontal lines can be decreased to 1/M by providing capacitor rows capable of simultaneously accumulating outputs from M horizontal lines and simultaneously reading out M pixels of the same color from the same vertical column to the horizontal read-out lines.

Example Embodiment 4

Figure 15:
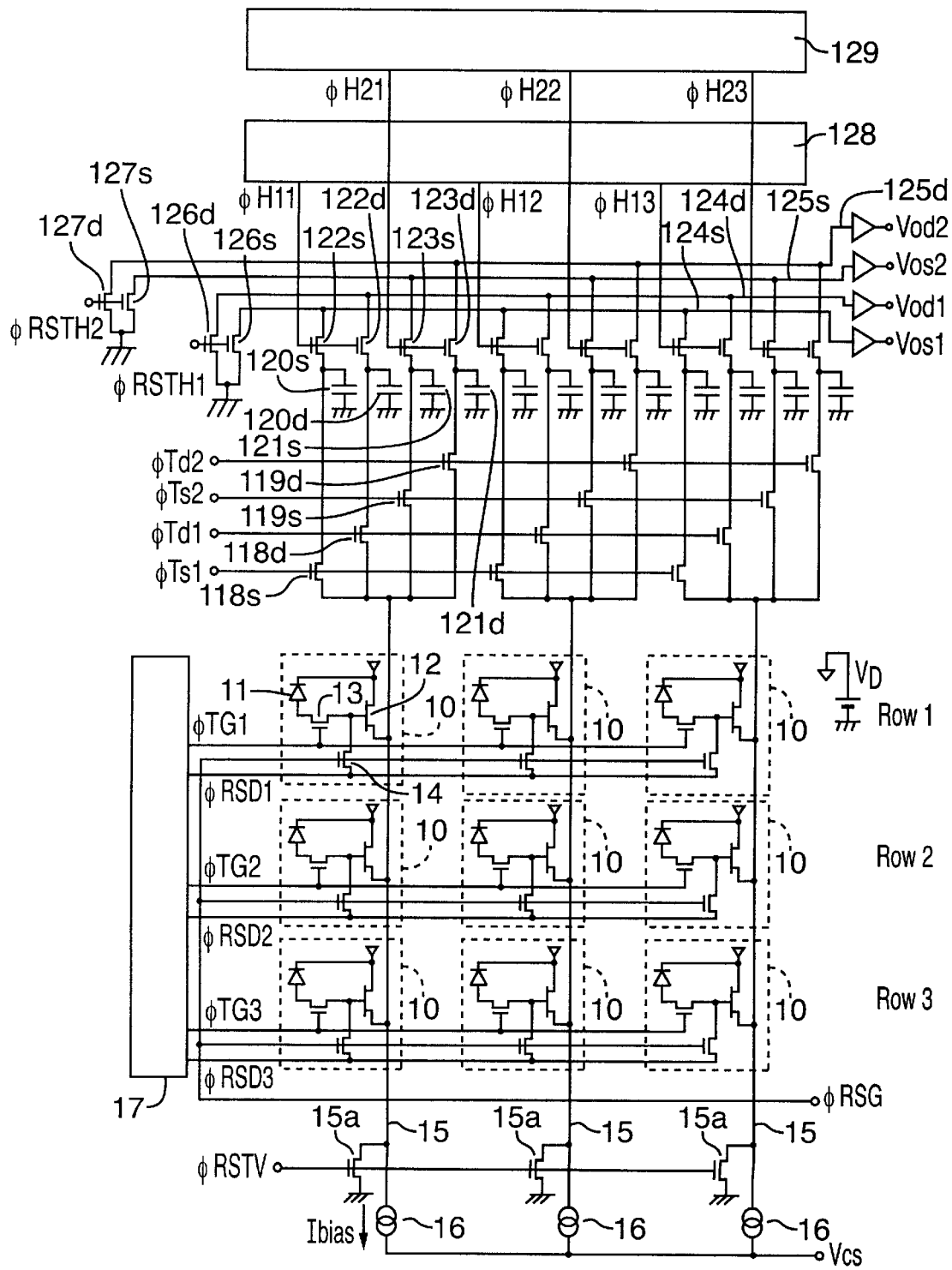
FIG. 15 is a schematic diagram showing an electrical circuit configuration for a solid-state image-pickup device according to a fourth example embodiment of the invention.

A schematic drawing showing the electrical circuit configuration of a solid-state image-pickup device according to this example embodiment is shown in FIG. 15. FIG. 15 shows several components having the same reference designators as corresponding components shown in FIG. 1, including the pixels 10, (each comprising a respective photodiode 11, a respective JFET 12, and respective MOS switches 13, 14); vertical read-out lines 15; reset MOS switches 15a; bias current sources 16; and signal lines corresponding to control pulse ΦRSG, respective control potentials ΦRSD1, ΦRSD2, . . . , and respective control pulses ΦTG1, ΦTG2, . . . These components serve the same functions in both of Example Embodiments 1 and 4. For the following discussion only the circuit elements that are different from those in Example Embodiment 1 are further discussed.

As in the Example Embodiment 1, the pixels 10 are arranged in a planar array of columns and rows. The outputs of the pixels in each column are connected to respective vertical read-out lines 15.

The output terminus of each vertical read-out line 15 is commonly connected to four MOS switches 118s, 118d, 119s, 119d. The MOS switches 118s, 118d, 119s, 119d collectively comprise a multiplexer circuit. The MOS switches are actuated by selectively supplying drive pulses ΦTs1, ΦTd1, ΦTs2, ΦTd2 to the respective gate electrodes of the MOS switches.

The MOS switches 118s, 118d, 119s, 119d are also respectively connected to capacitors 120s, 120d, 121s, 121d. One set of four capacitors is connected to each vertical read-out line 15. Collectively, these sets of capacitors are used to accumulate pixel output signals from one row of pixels. The capacitors 120s, 120d, 121s, 121d are respectively connected to horizontal read-out lines 124s, 124d, 125s, 125d via horizontal scanning MOS switches 122s, 122d, 123s, 123d, respectively.

The control outputs ΦHH11–ΦH13 of a first horizontal scanning circuit 128 are respectively connected to the gate electrodes of each set of the MOS switches 122s, 122d. The control outputs ΦH21–ΦH23 of a second horizontal scanning circuit 129 are respectively connected to the gate electrodes of each set of the MOS switches 123s, 123d. The reset MOS switches 126s, 126d, 127s, 127d are respectively connected to the horizontal read-out lines 124s, 124d, 125s, 125d. A reset drive pulse ΦRSTH1 is commonly connected to the gate electrodes of MOS switches 126s and 126d. A reset drive pulse ΦRSTH2 is commonly connected to the gate electrodes of MOS switches 127s and 127d.

A controller (not shown) can be utilized to provide control pulses serving as control signals for driving various circuit components. Such a controller can be similar to the controller 23 of Example Embodiment 1.

Figure 16:
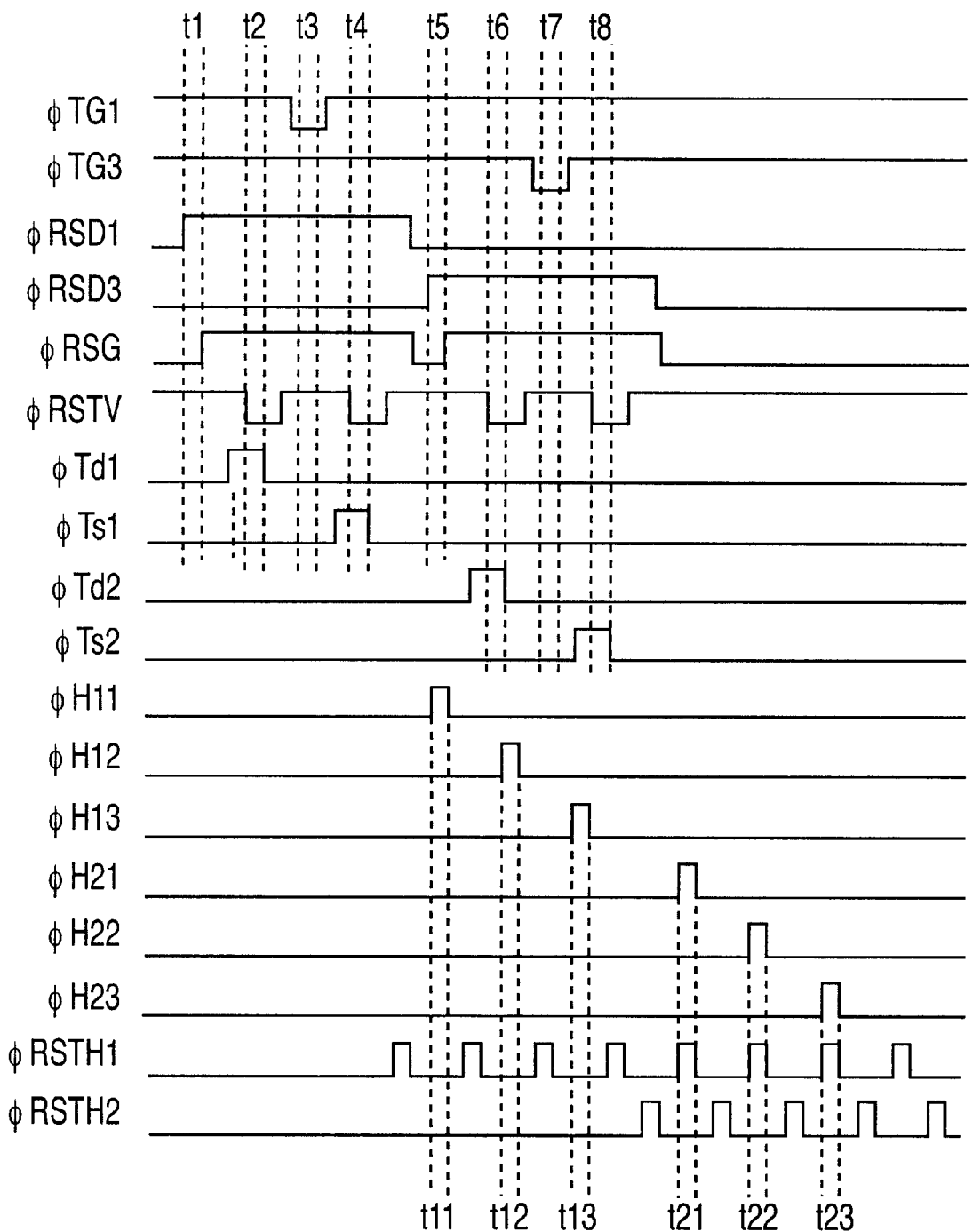
FIG. 16 is a timing chart for the FIG.-15 embodiment.
Figure 17:
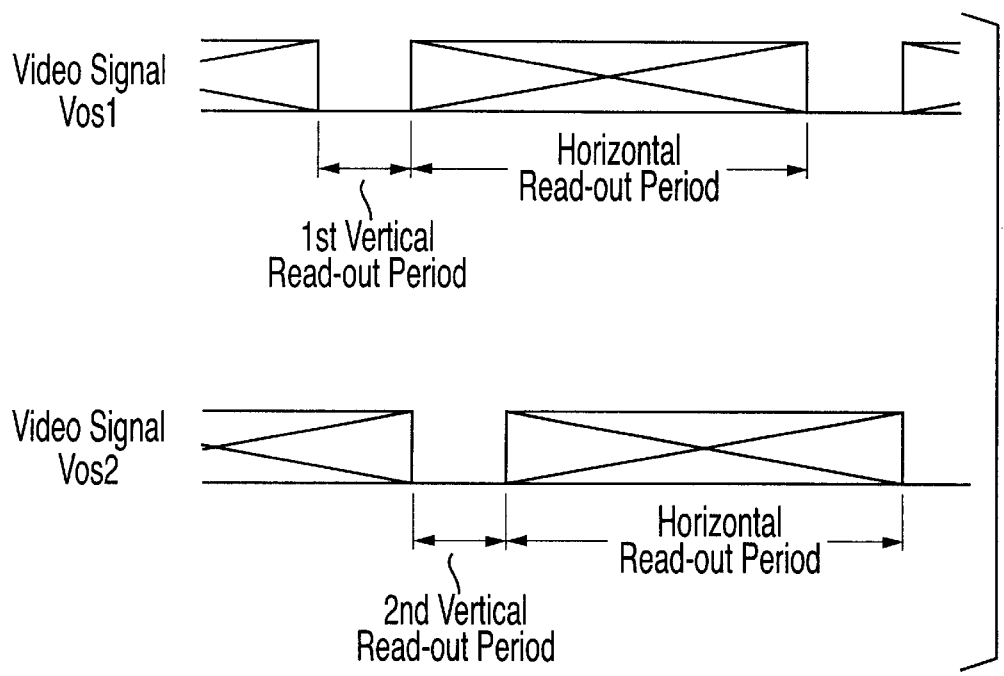
FIG. 17 is a chart showing the video signal output timing of the FIG.-15 embodiment.

FIG. 16 is a chart showing the drive timing, and FIG. 17 is a chart showing the output timing of the video signals produced by the FIG. 15 embodiment.

Referring to FIG. 16, during the timing periods t1–t4 the output signals from pixels in row 1 are accumulated in the capacitors 120s, 120d. Next, the horizontal scanning circuit 128 sequentially sets the control outputs ΦH11–ΦH13 to high potential during the timing periods t11–t13 (which immediately follow the first vertical read-out period). As a result, the pixel output signals from row 1 that have accumulated in capacitors 120s, 120d are sequentially read out by the horizontal read-out lines 124s, 124d via the MOS switches 122s, 122d, and output as video signals Vos1, Vod1.

While the horizontal shifting of the pixels in row 1 (periods t11–t13) is occurring, the vertical scanning circuit 17 vertically reads out the dark signals and light signals outputs from the pixels in row 3, as identified by the timing periods t5–t8. By these operations the pixel output signals from row 3 are accumulated in the capacitors 121s, 121d.

Immediately following the second vertical read-out period, the horizontal scanning circuit 129 sequentially sets control outputs ΦH21–ΦH23 to high potential during respective time periods t21–t23. As a result, the signals of the pixels in row 3 that have accumulated in capacitors 121s, 121d are sequentially read out by the horizontal read-out lines 125s, 125d via the MOS switches 123s, 123d, and output as video signals Vos2, Vod2.

A high-quality video signal can be produced by an external processing circuit (not shown) that determines the difference between the video signals Vos2, Vod2.

By the operations described above, the video signals from the pixels in rows 1 and 3 are read out, separated by a slight time differential. This is illustrated in FIG. 17, wherein the upper timing line corresponds to events occurring during the time periods t1–t4, and the lower timing line corresponds to events occurring during the time periods t5–t8.

Figure 18:
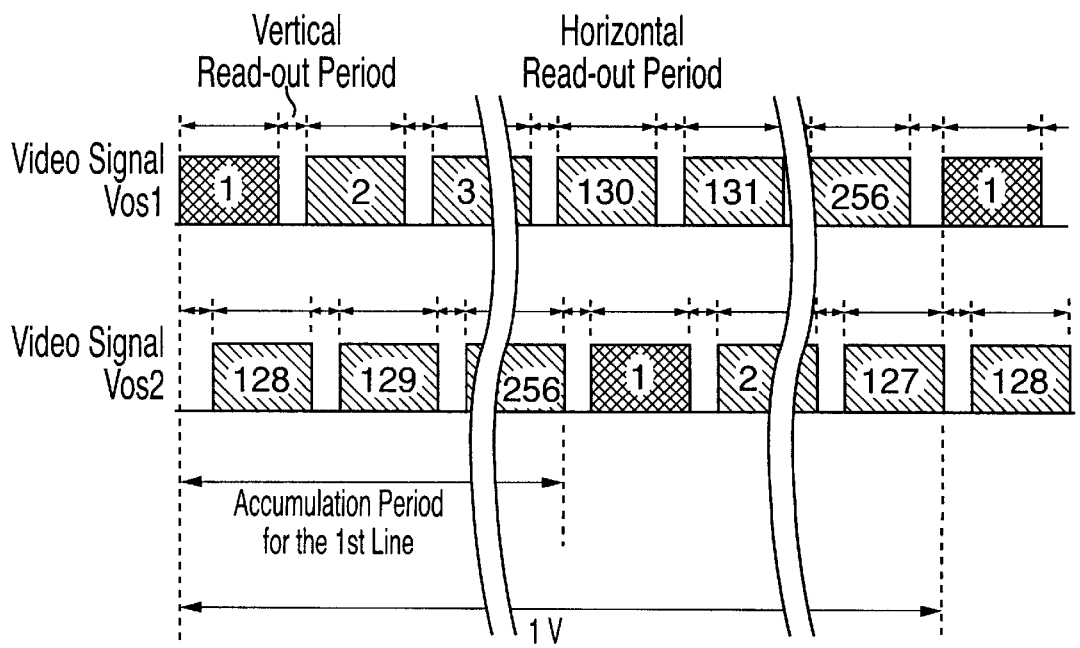
FIG. 18 is a video signal output timing chart for an exemplary 256-line read-out as performed by the FIG.-15 embodiment.

An increase in video signal throughput can be obtained by repeating the above read-out operations described above while vertically shifting the position of the row of pixels being read. This facilitates improvements in display performance, as illustrated by FIG. 18. In FIG. 18, video signals made from 256 rows of pixels are read out in parallel, two rows at a time, slightly staggered. This embodiment makes it possible to read out two entire screens of video signals Vos1, Vos2 within one vertical reference period (1V in FIG. 18).

Figure 24:
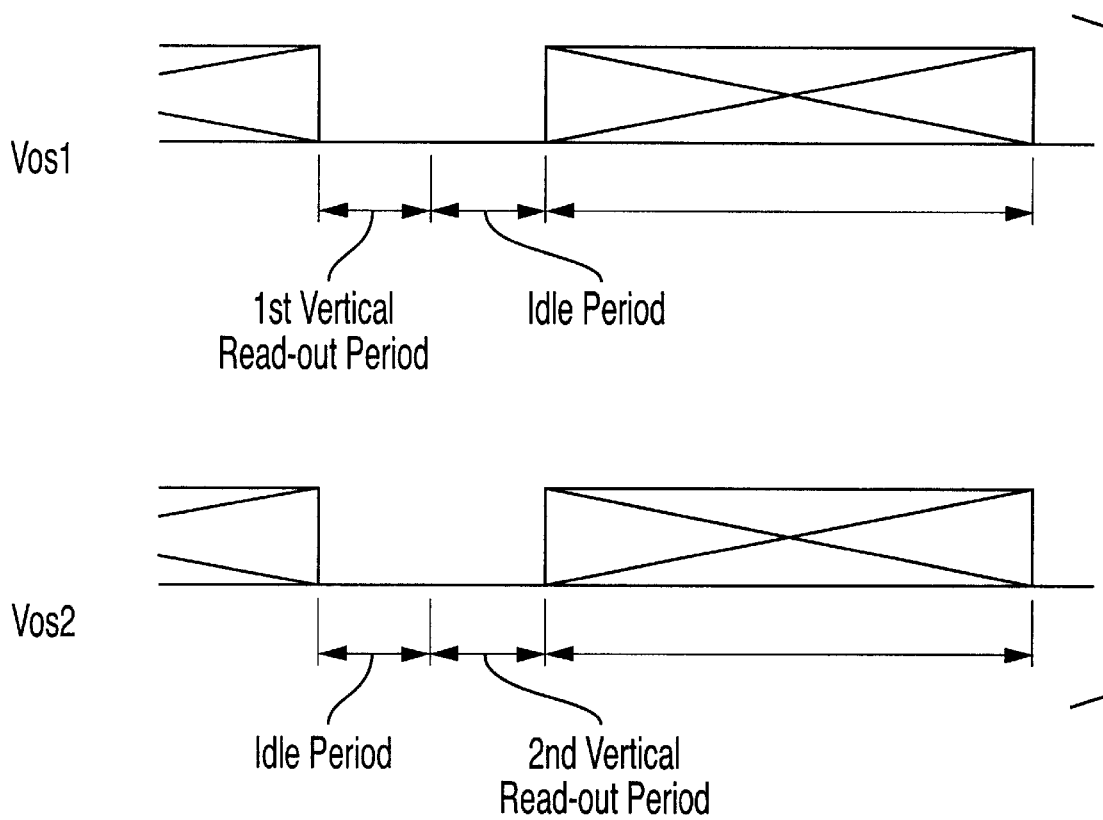
FIG. 24 is a chart showing the video signal output timing of the conventional solid-state image-pickup device of FIG. 23.

In this example embodiment the horizontal scanning circuits 28, 29 perform horizontal shifting so as to produce a video signal with reduced idle time. The video signal comprises the pixel output signals of two horizontal lines, with a slightly staggered overlap, as shown in FIGS. 17 and 18. Read-out of a horizontal line is promptly performed immediately following completion of accumulation in its respective capacitor group; i.e., read-out of horizontal line N immediately follows accumulation (vertical read-out) of horizontal line N in capacitors 120s, 120d, and read-out of horizontal line N+1 immediately follows accumulation (vertical read-out) of horizontal line N+1 in capacitors 121s, 121d. Consequently, the conventional idle time (FIG. 24) is reduced by half, facilitating improvements in photography speed.

Example Embodiment 5

Figure 19:
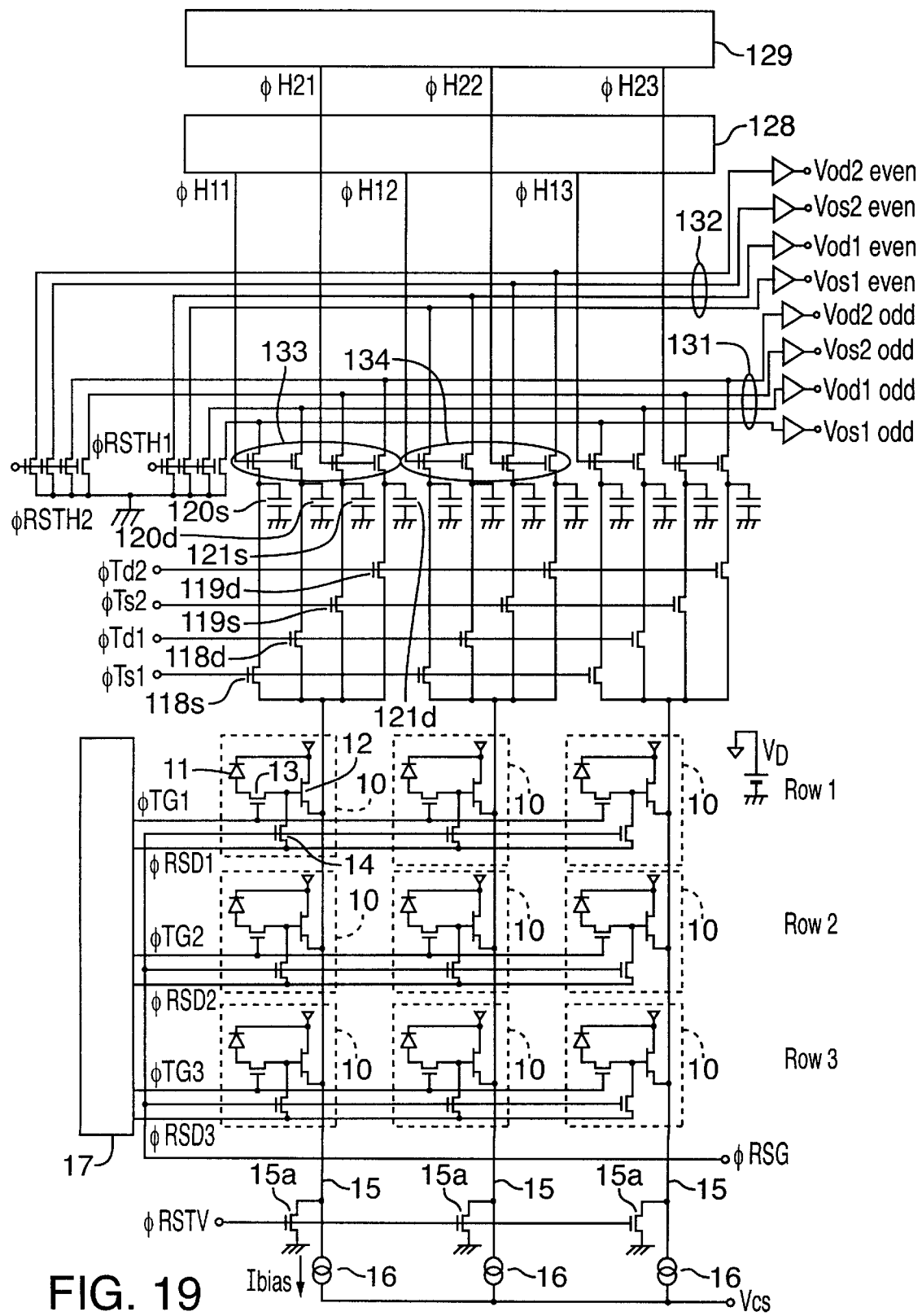
FIG. 19 is a schematic diagram showing an electrical circuit configuration for a solid-state image-pickup device according to a fifth example embodiment of the invention.

A schematic drawing showing the electrical circuit configuration of a solid-state image-pickup device according to this example embodiment is shown in FIG. 19.

Many circuit components of the FIG. -19 embodiment share common reference designators with corresponding components shown in FIG. 15 (pertaining to Example Embodiment 4). These components serve the same functions in both Example Embodiments 4 and 5, and are not further described below.

A characteristic feature of this example embodiment is that it employs two sets of horizontal read-out lines 131, 132. The pixel output signals carried by the odd vertical lines 15 are connected to the horizontal read-out line set 131 via MOS switch groups 133. The pixel output signals carried by the even vertical lines are connected to the horizontal read-out line set 132 via MOS switch groups 134. A multiplexer, comprising groups of MOS switches 118s, 118d, 119s, 119d, distributes the vertical line 15 outputs to be accumulated in respective groups of capacitors 120s, 120d, 121s, 121d.

Figure 20:
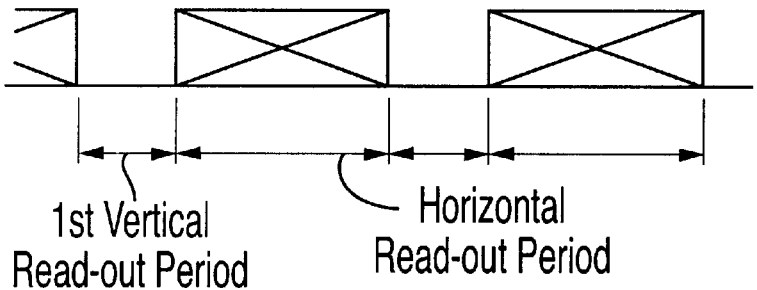
FIG. 20 is a chart showing the video signal output timing of the FIG.-19 embodiment.
Figure 20:
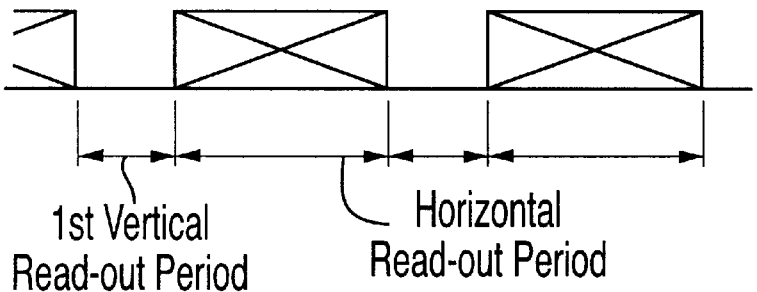
Figure 20:
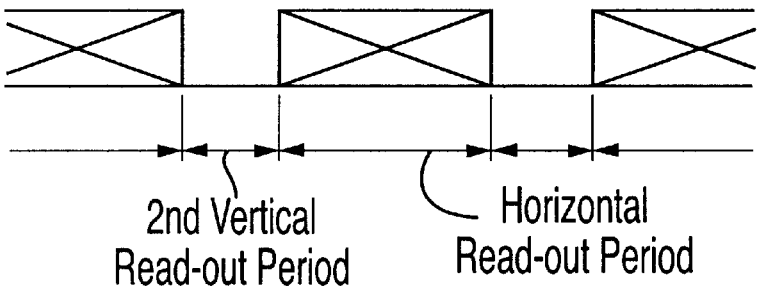
Figure 20:
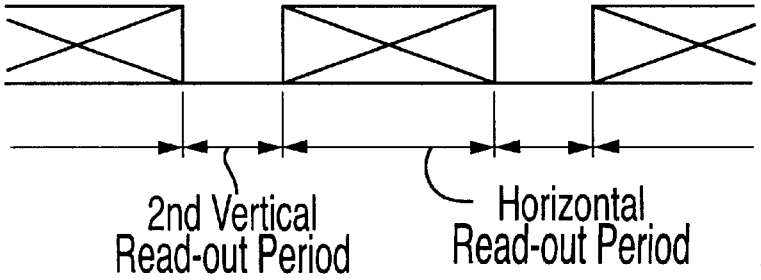
Figure 21:
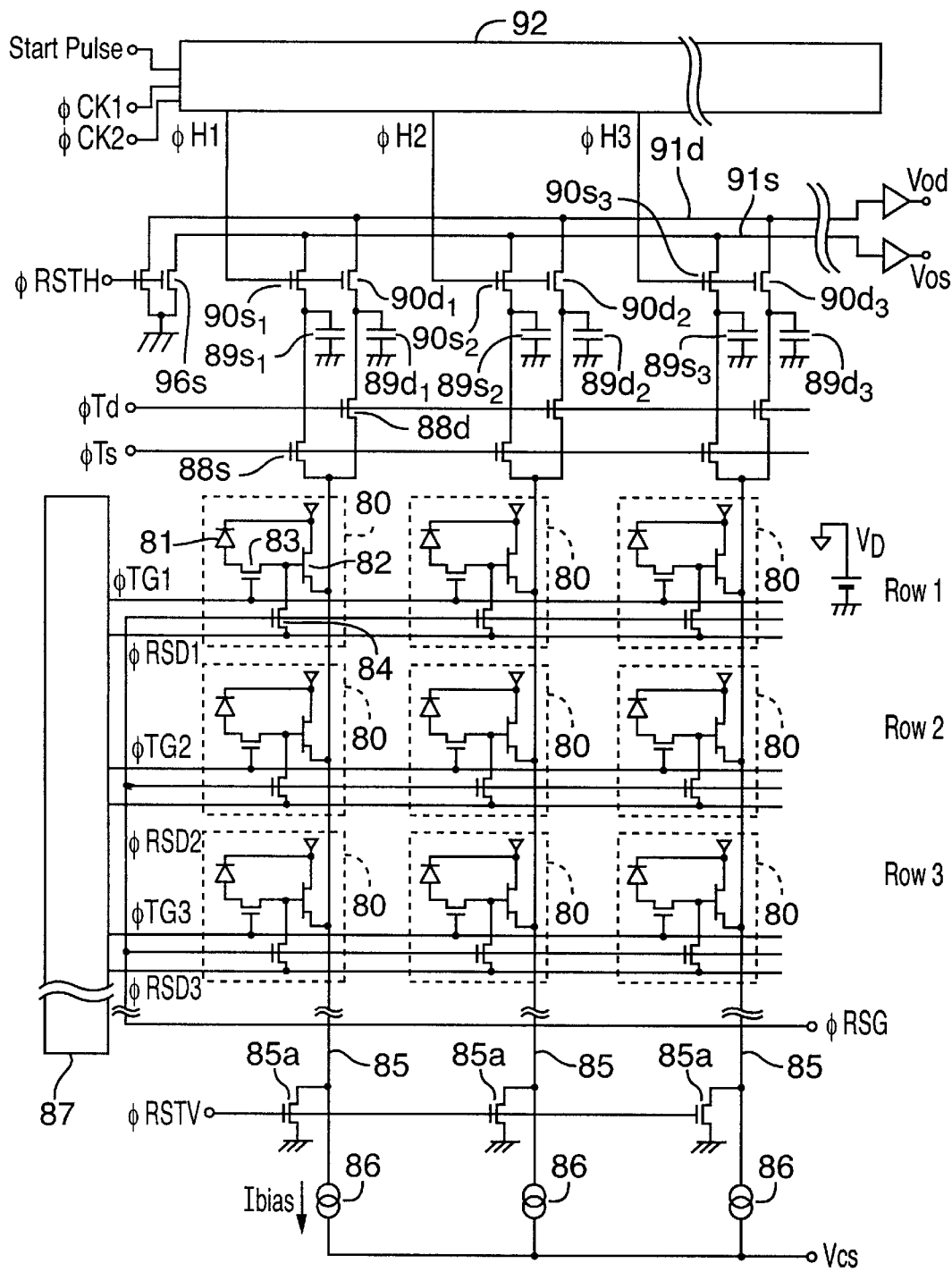
FIG. 21 is a schematic drawing showing the electrical circuit configuration of a conventional solid-state image-pickup device.
Figure 22:
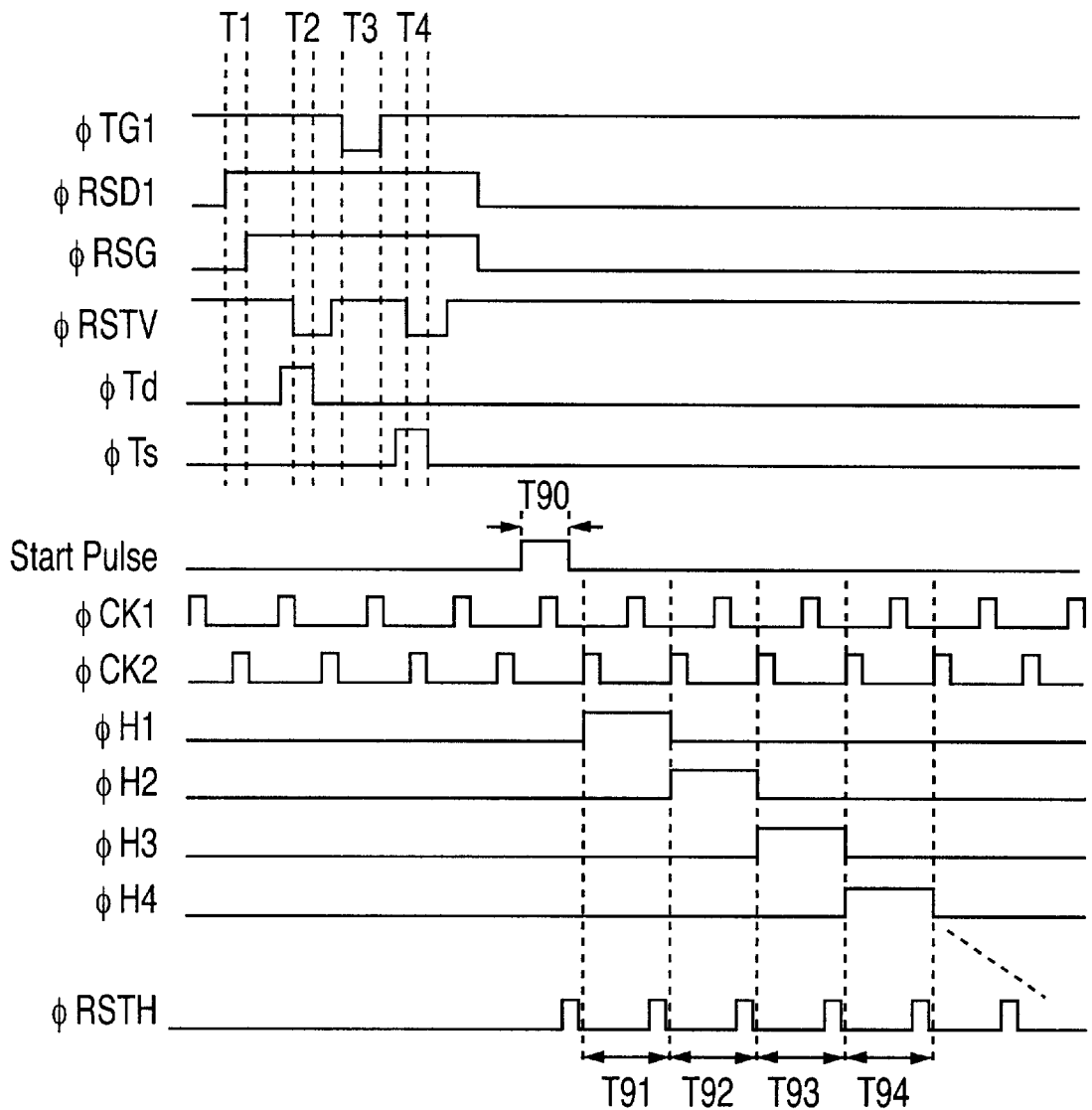
FIG. 22 is a chart showing the drive timing of the conventional solid-state image-pickup device of FIG. 21.
Figure 23:
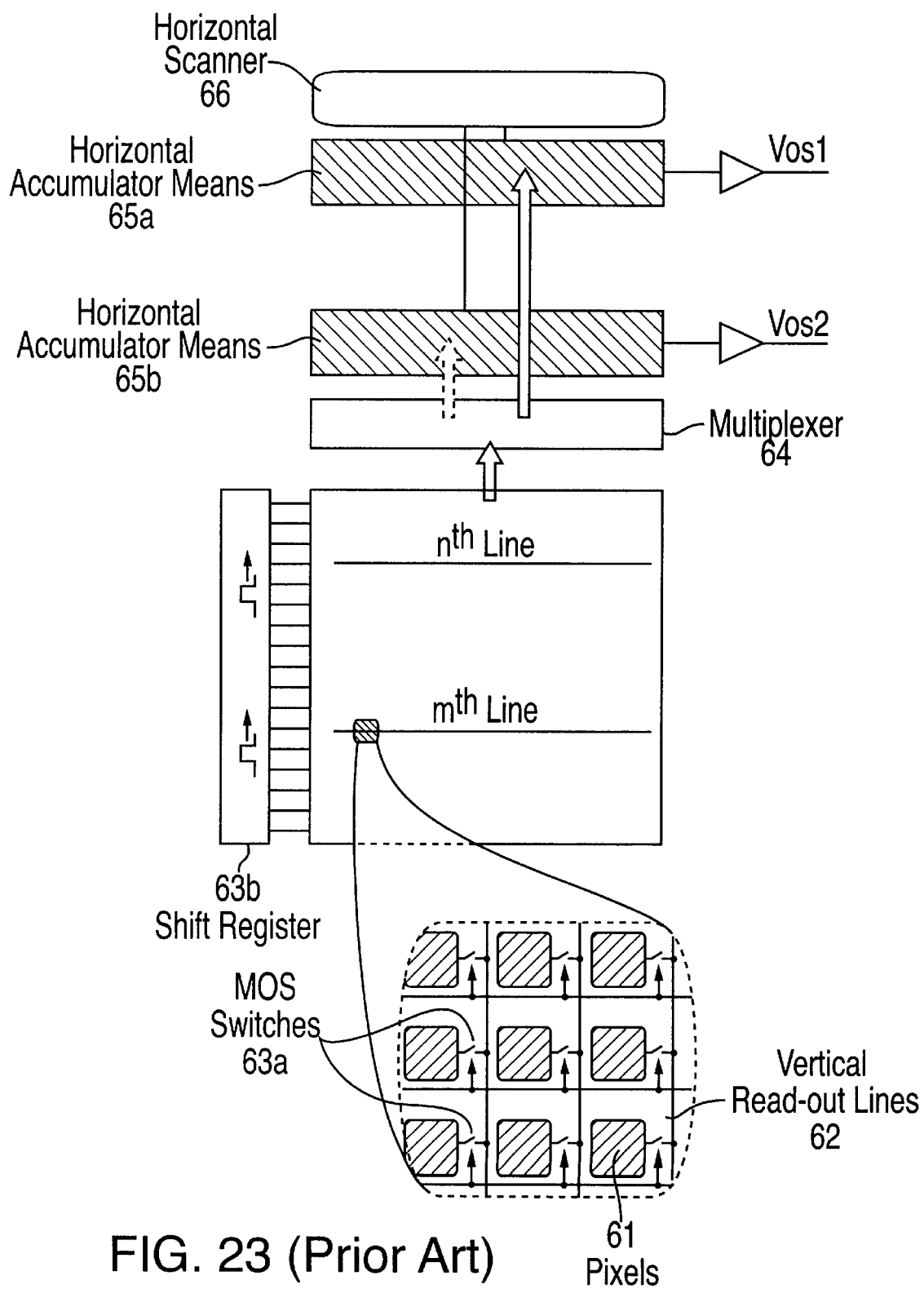
FIG. 23 is a block schematic diagram for a conventional solid-state image-pickup device.

FIG. 20 is a chart showing the video signal output timing for this example embodiment. The odd-numbered pixels and even-numbered pixels in a row can be simultaneously read out to the horizontal read-out lines 131, 132, e.g., by simultaneously switching ΦH11 and ΦH12 to high potential. This reduces the horizontal read-out period by half, thereby facilitating improved photography speeds.

In this example embodiment, the pixel output signals for each row were divided into even and odd numbered pixels that are shifted in parallel. This is not meant to be a limitation. It is generally acceptable to divide a horizontal line into a number of segments, which may then be shifted in parallel. For example, a horizontal line can be divided into a front half and a back half and parallel shifted, or a horizontal line can be divided into three or more parts and parallel shifted.

In addition, in Example Embodiments 4 and 5, the outputs from two rows of pixels were read out in parallel. It will be understood that, using an analogous scheme, the outputs from three or more rows of pixels can be read out in parallel, thereby facilitating even further increases in photography speed.

Several of the example embodiments discussed above contained reference to specific circuit components. It will be understood that these embodiments do not mandate the use of these specific components. On the contrary, circuit elements that perform the equivalent functions can be substituted where applicable. For example, in the foregoing example embodiments the horizontal shifting of the output signals for a row of pixels was accomplished by connecting the groups of accumulation capacitors to the horizontal read-out lines via groups of MOS switches. An alternative to this scheme is to use multiple HCCD's arrayed in place of the capacitors, and horizontally shifting them by CCD drive.

In several of the foregoing example embodiments reference is made to a controller that provides control pulses to drive various circuit components. The controller need not be a separate component. For example, the control pulses that drive individual circuit components can be internally provided by each component. Alternately, the control pulses can be provided by one or more of the existing circuit components, such as the horizontal scanning means.

In the above description of the example embodiments reference is made to individual circuit components, e.g., a horizontal accumulator. There is no requirement for using discrete components. On the contrary, all of the circuit elements can reside on a single integrated circuit.

In the example embodiments discussed above, addition of the pixel output signals was accomplished by simultaneously placing the charges from multiple capacitors upon a horizontal read-out line. Some losses can occur during this type of capacity distribution due to the charge being distributed into the floating capacity of the horizontal read-out lines. However, when the number of capacitors simultaneously connected to the horizontal read-out lines is increased, the amount of loss due to the floating capacity of the horizontal read-out lines commensurately decreases.

While the present invention has been described in connection with preferred embodiments, it will be understood that the invention is not limited to those embodiments. On the contrary, the invention is intended to cover all alternatives, modifications, and equivalents as may be included within the spirit and scope of the invention as defined in the appended claims.

What is claimed is:

1. A solid state image-pickup device, comprising:

(a) multiple pixels arranged in a planar array of columns and rows, each pixel producing an electrical output signal according to a light quantity received by the pixel;

(b) a separate vertical read-out line for each column of pixels, each pixel in the respective column having an output connected to the respective vertical read-out line, each vertical read-out line having an output terminus;

(c) a vertical scanning circuit that controllably switches the outputs of the pixels in each column to the respective vertical read-out line according to a predetermined horizontal-line read-out sequence;

(d) a multiplexer connected to the output termini of the vertical read-out lines, the multiplexer distributing the pixel output signals carried by the vertical read-out lines to multiple multiplexer outputs;

(e) a horizontal accumulator, connected to the multiplexer outputs, the horizontal accumulator temporarily accumulating the respective pixel output signals from the multiplexer outputs for delivery to horizontal-accumulator outputs;

(f) a horizontal read-out line connected to the outputs of the horizontal-accumulator outputs; and (g) horizontal scanning means for controllably triggering pixel output signals of sequentially arranged groups of pixels, each group comprising at least two adjacent pixels in the array, for sequential read-out from the horizontal accumulator to the horizontal read-out line, said horizontal scanning means simultaneously triggering the output signals of the pixels in each group, at time of read-out of the group, for delivery to the horizontal read-out line, said horizontal scanning means comprising a horizontal shift register and a horizontal selection circuit, wherein outputs of the horizontal shift register are connected to respective inputs of the horizontal selection circuit, and outputs from the horizontal selection circuit are triggered by independent control pulses and are triggered by a periodic pulse and serve as control signals for driving the horizontal accumulator.

2. The solid-state image-pickup device of claim 1, comprising multiple horizontal read-out lines, the respective pixel output signals accumulated in the horizontal accumulator being read-out onto the horizontal read-out lines to form a video signal.

3. The solid-state image-pickup device of claim 2, comprising two horizontal read-out lines.

4. The solid-state image-pickup device of claim 2, comprising four horizontal read-out lines.

5. The solid-state image-pickup device of claim 1, wherein control inputs for the multiple pixels are commonly connected by row to respective control signal lines output from the vertical scanning circuit.

6. A solid-state image-pickup device comprising:
(a) multiple pixels arranged in a planar array of columns and rows, each pixel producing an electrical output signal according to a light quantity received by the pixel;
(b) a separate vertical read-out line for each column of pixels, each pixel in the respective column having an output connected to the respective vertical read-out line, each vertical read-out line having an output terminus;
(c) a vertical scanning circuit that controllably switches the outputs of the pixels in each column to the respective vertical read-out line according to a predetermined horizontal-line read-out sequence;
(d) a multiplexer connected to the output termini of the vertical read-out lines, the multiplexer distributing the pixel output signals carried by the vertical read-out lines to multiple multiplexer outputs;
(e) a horizontal accumulator, connected to the multiplexer outputs, the horizontal accumulator temporarily accumulating the respective pixel output signals from the multiplexer outputs for delivery to horizontal-accumulator outputs;
(f) a horizontal read-out line connected to the outputs of the horizontal-accumulator outputs; and
(g) horizontal scanning means for controllably triggering pixel output signals of sequentially arranged groups of pixels, each group comprising at least two adjacent pixels in the array, for sequential read-out from the horizontal accumulator to the horizontal read-out line, said horizontal scanning means simultaneously triggering the output signals of the pixels in each group, at time of read-out of the group, for delivery to the horizontal read-out line, said horizontal scanning means comprising a horizontal shift register and two horizontal selection circuits each having an output and an input, the horizontal shift register outputs being commonly connected in pairs to respective inputs of the horizontal selection circuits, the outputs from the horizontal selection circuits being triggered by independent control pulses and serving as control signals for driving the horizontal accumulator.

7. The solid-state image-pickup device of claim 6, comprising multiple horizontal read-out lines, the respective pixel output signals accumulated in the horizontal accumulator being read-out onto the horizontal read-out lines to form a video signal.

8. The solid-state image-pickup device of claim 7, comprising two horizontal read-out lines.

9. The solid-state image-pickup device of claim 7, comprising four horizontal read-out lines.

10. The solid-state image-pickup device of claim 6, wherein control inputs for the multiple pixels are commonly connected by row to respective control signal lines output from the vertical scanning circuit.

11. A solid-state image-pickup device, comprising:
(a) multiple pixels arranged in a planar array of columns and rows, each pixel producing an electrical output signal according to a light quantity received by the pixel;
(b) a separate vertical read-out line for each column of pixels, each pixel in the respective column having an output connected to the respective vertical read-out line, each vertical read-out line having an output terminus;
(c) a vertical scanning circuit that controllably switches the outputs of the pixels in each column to the respective vertical read-out line according to a predetermined horizontal-line read-out sequence;
(d) a multiplexer connected to the output termini of the vertical read-out lines, the multiplexer distributing the pixel output signals carried by the vertical read-out lines to multiple multiplexer outputs;
(e) a horizontal accumulator, connected to the multiplexer outputs, the horizontal accumulator temporarily accumulating the respective pixel output signals from the multiplexer outputs for delivery to horizontal-accumulator outputs;
(f) a horizontal read-out line connected to the outputs of the horizontal-accumulator outputs;
(g) horizontal scanning means for controllably triggering pixel output signals of sequentially arranged groups of pixels, each group comprising at least two adjacent pixels in the array, for sequential read-out from the horizontal accumulator to the horizontal read-out line, said horizontal scanning means simultaneously triggering the output signals of the pixels in each group, at time of read-out of the group, for delivery to the horizontal read-out line; and
(h) a controller connected to said horizontal scanning means, the controller providing pulses to said horizontal scanning means to sequentially read out the pixel output signals temporarily accumulated in the horizontal accumulator in N, where $N \geq 2$, horizontally adjacent pixel units so as to output a video signal in which the number of horizontal pixels is decreased to $1/N$.

12. A solid-state image-pickup device, comprising:
(a) multiple pixels arranged in a planar array of columns and rows, each pixel producing an electrical output signal according to a light quantity received by the pixel;
(b) a separate vertical read-out line for each column of pixels, each pixel in the respective column having an output connected to the respective vertical read-out line, each vertical read-out line having an output terminus;
(c) a vertical scanning circuit that controllably switches the outputs of the pixels in each column to the respective vertical read-out line according to a predetermined horizontal-line read-out sequence;
(d) a multiplexer connected to the output termini of the vertical read-out lines, the multiplexer distributing the pixel output signals carried by the vertical read-out lines to multiple multiplexer outputs;
(e) a horizontal accumulator, connected to the multiplexer outputs, the horizontal accumulator temporarily accumulating the respective pixel output signals from the multiplexer outputs for delivery to horizontal-accumulator outputs;
(f) a horizontal read-out line connected to the outputs of the horizontal-accumulator outputs;
(g) horizontal scanning means for controllably triggering pixel output signals of sequentially arranged groups of pixels, each group comprising at least two adjacent pixels in the array, for sequential read-out from the horizontal accumulator to the horizontal read-out line, said horizontal scanning means simultaneously triggering the output signals of the pixels in each group, at time of read-out of the group, for delivery to the horizontal read-out line; and (h) a controller connected to said horizontal scanning means, the controller providing pulses to said horizontal scanning means to sequentially read out the pixel output signals temporarily accumulated in the horizontal accumulator in M, where M≧2, vertically adjacent pixel units so as to output a video signal in which the number of vertical pixels is decreased to 1/M.

13. A solid-state image-pickup device, comprising:
(a) multiple pixels arranged in a planar array of columns and rows, each pixel producing an electrical output signal according to a light quantity received by the pixel;
(b) a separate vertical read-out line for each column of pixels, each pixel in the respective column having an output connected to the respective vertical read-out line, each vertical read-out line having an output terminus;
(c) a vertical scanning circuit that controllably switches the outputs of the pixels in each column to the respective vertical read-out line according to a predetermined horizontal-line read-out sequence;
(d) a multiplexer connected to the output termini of the vertical read-out lines, the multiplexer distributing the pixel output signals carried by the vertical read-out lines to multiple multiplexer outputs;
(e) a horizontal accumulator, connected to the multiplexer outputs, the horizontal accumulator temporarily accumulating the respective pixel output signals from the multiplexer outputs for delivery to horizontal-accumulator outputs;
(f) a horizontal read-out line connected to the outputs of the horizontal-accumulator outputs;
(g) horizontal scanning means for controllably triggering pixel output signals of sequentially arranged groups of pixels, each group comprising at least two adjacent pixels in the array, for sequential read-out from the horizontal accumulator to the horizontal read-out line, said horizontal scanning means simultaneously triggering the output signals of the pixels in each group, at time of read-out of the group, for delivery to the horizontal read-out line; and
(h) a controller connected to said horizontal scanning means, the controller providing pulses to said horizontal scanning means to sequentially read out the pixel output signals temporarily accumulated in the horizontal accumulator in (N horizontal pixel×M vertical pixel) adjacent pixel units, where N≧2 and M≧2, so as to output a video signal in which the number of horizontal pixels is decreased to 1/N, and the number of vertical pixels is decreased to 1/M.

14. A solid-state image-pickup device, comprising:
(a) multiple pixels arranged in a planar array of columns and rows, each pixel producing an electrical output signal according to a light quantity received by the pixel;
(b) a separate vertical read-out line for each column of pixels, each pixel in the respective column having an output connected to the respective vertical read-out line, each vertical read-out line having an output terminus;
(c) a vertical scanning circuit that controllably switches the outputs of the pixels in each column to the respective vertical read-out line according to a predetermined horizontal-line read-out sequence;
(d) a multiplexer connected to the output termini of the vertical read-out lines, the multiplexer distributing the pixel output signals carried by the vertical read-out lines to multiple multiplexer outputs;
(e) a horizontal accumulator, connected to the multiplexer outputs, the horizontal accumulator temporarily accumulating the respective pixel output signals from the multiplexer outputs for delivery to horizontal-accumulator outputs;
(f) a horizontal read-out line connected to the outputs of the horizontal-accumulator outputs;
(g) horizontal scanning means for controllably triggering pixel output signals of sequentially arranged groups of pixels, each group comprising at least two adjacent pixels in the array, for sequential read-out from the horizontal accumulator to the horizontal read-out line, said horizontal scanning means simultaneously triggering the output signals of the pixels in each group, at time of read-out of the group, for delivery to the horizontal read-out line;
(h) a controller connected to said horizontal scanning means; and
(i) red (R), green (G), and blue (B) filters arranged in a Bayer array sequence above the pixels, the pixels being grouped by R, G, and B color designators such that no two horizontally or vertically adjacent pixels share the same designator, the pixels designated with a G being diagonally connected throughout the array and the remaining pixels being designated by alternating rows of R and B, the controller driving said horizontal scanning means to sequentially read out the pixel output signals temporarily accumulated in the horizontal accumulator in units of N, where N≧2, horizontally adjacent pixels of the same color designation so as to output a video signal in which the number of horizontal pixels is decreased to 1/N.

15. A solid-state image-pickup device, comprising:
(a) multiple pixels arranged in a planar array of columns and rows, each pixel producing an electrical output signal according to a light quantity received by the pixel;
(b) a separate vertical read-out line for each column of pixels, each pixel in the respective column having an output connected to the respective vertical read-out line, each vertical read-out line having an output terminus;
(c) a vertical scanning circuit that controllably switches the outputs of the pixels in each column to the respective vertical read-out line according to a predetermined horizontal-line read-out sequence;
(d) a multiplexer connected to the output termini of the vertical read-out lines, the multiplexer distributing the pixel output signals carried by the vertical read-out lines to multiple multiplexer outputs;
(e) a horizontal accumulator, connected to the multiplexer outputs, the horizontal accumulator temporarily accumulating the respective pixel output signals from the multiplexer outputs for delivery to horizontal-accumulator outputs;
(f) a horizontal read-out line connected to the outputs of the horizontal-accumulator outputs;

(g) horizontal scanning means for controllably triggering pixel output signals of sequentially arranged groups of pixels, each group comprising at least two adjacent pixels in the array, for sequential read-out from the horizontal accumulator to the horizontal read-out line, said horizontal scanning means simultaneously triggering the output signals of the pixels in each group, at time of read-out of the group, for delivery to the horizontal read-out line;

(h) a controller connected to said horizontal scanning means; and (i) red (R), green (G), and blue (B) filters arranged in a Bayer array sequence above the pixels, the pixels being grouped by R, G, and B color designators such that no two horizontally or vertically adjacent pixels share the same designator, the pixels designated with a G being diagonally connected throughout the array and the remaining pixels being designated by alternating rows of R and B, the controller driving said horizontal scanning means to sequentially read out the pixel output signals temporarily accumulated in the horizontal accumulator in units of M, where M≧2, vertical pixels of the same color designation so as to output a video signal in which the number of vertical pixels is decreased to 1/M.

16. A solid state image-pickup device, comprising:

(a) multiple pixels arranged in a planar array of columns and rows, each pixel producing an electrical output signal according to a light quantity received by the pixel;

(b) a separate vertical read-out line for each column of pixels, each pixel in the respective column having an output connected to the respective vertical read-out line, each vertical read-out line having an output terminus;

(c) vertical scanning means for controllably switching the outputs of the pixels in each column to the respective vertical read-out line according to a predetermined horizontal-line read-out sequence;

(d) a multiplexer connected to the output termini of the vertical read-out lines, the multiplexer dividing the pixel output signals carried by the vertical read-out lines into multiple groups and distributing the grouped signals to multiple multiplexer outputs;

(e) a respective horizontal accumulator connected to each respective multiplexer output, each horizontal accumulator temporarily accumulating respective pixel output signals from the respective multiplexer output for delivery to respective outputs of the horizontal accumulators;

(f) horizontal read-out lines connected to the outputs of the horizontal accumulators; and (g) multiple horizontal scanning circuits each connected to a horizontal accumulator, each horizontal scanning circuit individually driving a respective horizontal accumulator to sequentially read out the accumulated pixel output signals to the respective horizontal read-out lines to form a video signal, wherein the pixel output signals from M, where M≧1, horizontal lines of pixels are divided and simultaneously accumulated in the respective horizontal accumulators, and the horizontal scanning circuits individually drive respective horizontal accumulators in parallel to horizontally shift the pixel output signals from M horizontal lines of pixels onto the horizontal read-out lines to form a video signal.

17. The solid-state image-pickup device of claim 16, wherein each horizontal scanning circuit horizontally shifts the output signals from a horizontal line of pixels from the respective horizontal accumulator after completing the accumulation of the outputs signals in the corresponding horizontal accumulator.

18. The solid-state image-pickup device of claim 13, wherein the respective pixel output signals accumulated in the horizontal accumulators are read-out onto eight horizontal read-out lines to form a video signal.

19. A drive method for reading out a video signal from a solid-state image-pickup device that comprises multiple pixels arranged in a planar array of columns and rows, each pixel producing an electrical output signal according to a light quantity received by the pixel; a separate vertical read-out line for each column of pixels, each pixel in the respective column having an output connected to the respective vertical read-out line, and each vertical read-out line having a terminus; a vertical scanning circuit that controllably switches the output signals of the pixels in each column to the respective vertical read-out line according to a predetermined horizontal-line read-out sequence; a multiplexer, connected to the output termini of the vertical read-out lines that distributes the pixel output signals carried by the vertical read-out lines to multiple destinations; a horizontal accumulator connected to the multiplexer outputs, the horizontal accumulator temporarily accumulating the respective pixel output signals from the multiplexer for delivery to horizontal-accumulator outputs; and horizontal read-out lines connected to the horizontal accumulator to read out the pixel output signals temporarily accumulated in the horizontal accumulator, the drive method comprising the steps:

(a) vertically scanning the pixel output signals for a selected horizontal row of pixels to the vertical read-out lines;

(b) horizontally accumulating the pixel output signals on the vertical read-out lines in the horizontal accumulator;

(c) horizontally scanning the pixel output signals temporarily accumulated in the horizontal accumulator in N (where N≧2) horizontal pixel units to the horizontal read-out lines, and (d) repeating steps (a)–(c) with the selected horizontal line being vertically shifted to produce a video signal in which the number of horizontal pixels is reduced to 1/N.

20. A drive method for reading out a video signal from a solid-state image-pickup device that comprises multiple pixels arranged in a planar array of columns and rows, each pixel producing an electrical output signal according to a light quantity received by the pixel; a separate vertical read-out line for each column of pixels, each pixel in the respective column having an output connected to the respective vertical read-out line, and each vertical read-out line having a terminus; a vertical scanning circuit that controllably switches the output signals of the pixels in each column to the respective vertical read-out line according to a predetermined horizontal-line read-out sequence; a multiplexer, connected to the output termini of the vertical read-out lines that distributes the pixel output signals carried by the vertical read-out lines to multiple destinations; a horizontal accumulator connected to the multiplexer outputs, the horizontal accumulator temporarily accumulating the respective pixel output signals from the horizontal lines of pixels for delivery to horizontal-accumulator outputs; and horizontal read-out lines connected to the horizontal accumulator to read out the pixel output signals temporarily accumulated in the horizontal accumulator, the drive method comprising the steps:

(a) vertically scanning the pixel output signals for M, where M≧2, selected horizontal rows of pixels to the vertical read-out lines;

(b) horizontally accumulating the M horizontal rows of pixel output signals on the vertical read-out lines in the horizontal accumulator;

(c) horizontally scanning the M horizontal rows of pixel output signals temporarily accumulated in the horizontal accumulator in M vertical pixel units to the horizontal read-out lines, and (d) repeating steps (a)–(c) with the M selected horizontal lines being vertically shifted in groups of M to produce a video output in which the number of vertical pixels is reduced to 1/M.

21. A drive method for reading out a video signal from a solid-state image-pickup device that comprises multiple pixels arranged in a planar array of columns and rows, each pixel producing an electrical output signal according to a light quantity received by the pixel; a separate vertical read-out line for each column of pixels, each pixel in the respective column having an output connected to the respective vertical read-out line, and each vertical read-out line having a terminus; a vertical scanning circuit that controllably switches the output signals of the pixels in each column to the respective vertical read-out line according to a predetermined horizontal-line read-out sequence; a multiplexer, connected to the output termini of the vertical read-out lines that distributes the pixel output signals carried by the vertical read-out lines to multiple destinations; a horizontal accumulator connected to the multiplexer outputs, the horizontal accumulator temporarily accumulating the respective pixel output signals from the horizontal lines of pixels for delivery to horizontal-accumulator outputs; and horizontal read-out lines connected to the horizontal accumulator to read out the pixel output signals temporarily accumulated in the horizontal accumulator, the drive method comprising the steps:

(a) vertically scanning the pixel output signals for M, where M≧2, selected horizontal rows of pixels to the vertical read-out lines;

(b) horizontally accumulating the M horizontal rows of pixel output signals on the vertical read-out lines in the horizontal accumulator;

(c) horizontally scanning the M horizontal rows of pixel output signals temporarily accumulated in the horizontal accumulator in (N horizontal pixel×M vertical pixel) units to the horizontal read-out lines; and (d) repeating steps (a)–(c) with the M selected horizontal lines being vertically shifted in groups of M to produce a video output in which the number of horizontal pixels is reduced to 1/N and the number of vertical pixels is reduced to 1/M.

22. A drive method for reading out a video signal from a solid-state image-pickup device that comprises multiple pixels arranged in a planar array of columns and rows, each pixel producing an electrical output signal according to a light quantity received by the pixel; a separate vertical read-out line for each column of pixels, each pixel in the respective column having an output connected to the respective vertical read-out line, and each vertical read-out line having a terminus; a vertical scanning circuit that controllably switches the output signals of the pixels in each column to the respective vertical read-out line according to a predetermined horizontal-line read-out sequence; a multiplexer, connected to the output termini of the vertical read-out lines that distributes the pixel output signals carried by the vertical read-out lines to multiple destinations; a horizontal accumulator connected to the multiplex outputs, the horizontal accumulator temporarily accumulating the respective pixel output signals from the horizontal lines of pixels for delivery to horizontal-accumulator outputs; and horizontal read-out lines connected to the horizontal accumulator to read out the pixel output signals temporarily accumulated in the horizontal accumulator, the drive method comprising the steps:

(a) arranging the pixels in M, where M≧2, horizontal rows of pixels;

(b) configuring the horizontal accumulator with M separate horizontal accumulator units each corresponding to a respective horizontal row of pixels, and each having associated therewith a respective horizontal scanning circuit;

(c) vertically scanning the pixel outputs, for the M selected horizontal rows of pixels, to the vertical read-out lines;

(d) horizontally accumulating the M horizontal rows of pixel output signals on the vertical read-out lines in the respective horizontal accumulator units by driving the multiplexer in synchrony with the vertical scanning;

(e) individually driving each horizontal scanning circuit to collectively horizontally shift the M horizontal rows of pixel output signals temporally accumulated in the multiple respective horizontal accumulator units to the respective horizontal read-out lines, and (f) repeating steps (c)–(e) with the M selected horizontal lines being vertically shifted in groups of M to form a video signal.

23. The drive method of claim 22, wherein, in step (e), the horizontal shifting of the pixel output signals of a given horizontal line of pixels temporarily accumulated in a given individual horizontal accumulator unit occurs upon completion of the accumulation of pixel output signals by the respective horizontal accumulator unit.

24. The drive method of claim 23, further comprising the step of dividing the pixel output signals from each of the M horizontal lines of pixels into multiple segments and storing the divided pixel output signals in the multiple accumulator units during step (d), and driving the multiple horizontal accumulator units in parallel to horizontally shift the pixel output signals from the M horizontal lines of pixels onto the horizontal read-out lines during step (e).

* * * * *

UNITED STATES PATENT AND TRADEMARK OFFICE
CERTIFICATE OF CORRECTION

PATENT NO. : 6,377,304 B1
DATED : April 23, 2002
INVENTOR(S) : Akihiro Saitoh

It is certified that error appears in the above-identified patent and that said Letters Patent is hereby corrected as shown below:

Column 3,
Line 16, change "$89s_2$, $89d_2$" to -- $89s_1$, $89d_1$ --
Line 45, change "$89d_1$-$89d$" to -- $89d_1$-$89d_n$ --

Column 6,
Line 49, change "so-as" to -- so as --

Column 10,
Line 59, change "ΦH2,…" to -- ΦH2,…. --

Signed and Sealed this

Twenty-first Day of January, 2003

JAMES E. ROGAN
*Director of the United States Patent and Trademark Office*